United States Patent
Fujiwara et al.

(10) Patent No.: US 10,189,531 B2
(45) Date of Patent: Jan. 29, 2019

(54) BICYCLE OPERATING DEVICE

(71) Applicant: SHIMANO INC., Sakai (JP)

(72) Inventors: Takaaki Fujiwara, Sakai (JP); Kazutaka Fukao, Sakai (JP)

(73) Assignee: SHIMANO INC., Sakai (JP)

(*) Notice: Subject to any disclaimer, the term of this patent is extended or adjusted under 35 U.S.C. 154(b) by 592 days.

(21) Appl. No.: 14/707,068

(22) Filed: May 8, 2015

(65) Prior Publication Data

US 2016/0327070 A1 Nov. 10, 2016

(51) Int. Cl.
| | | |
|---|---|---|
| *B62M 25/04* | (2006.01) | |
| *B62L 3/02* | (2006.01) | |
| *B62K 23/06* | (2006.01) | |
| *B62K 23/00* | (2006.01) | |

(52) U.S. Cl.
CPC .............. *B62K 23/00* (2013.01); *B62K 23/06* (2013.01); *B62L 3/023* (2013.01); *B62M 25/04* (2013.01)

(58) Field of Classification Search
CPC ........ B62K 23/06; B62L 3/023; B62M 25/04; B60T 7/102; B60T 7/108
USPC .................................................. 60/594, 584
See application file for complete search history.

(56) References Cited

U.S. PATENT DOCUMENTS

| | | | | |
|---|---|---|---|---|
| 5,390,771 A | * | 2/1995 | Hinkens | .................... B62L 1/00 188/24.12 |
| 6,085,523 A | * | 7/2000 | Buckley | ................ B60T 11/232 60/533 |
| 7,578,375 B2 | * | 8/2009 | Lin | ........................... B60T 7/10 188/344 |
| 8,869,649 B2 | * | 10/2014 | Miki | ........................ B62J 99/00 74/501.6 |
| 2007/0175290 A1 | | 8/2007 | Fujii | |
| 2011/0031079 A1 | * | 2/2011 | Matsushita | ............. B60T 7/102 188/344 |
| 2011/0147149 A1 | | 6/2011 | Tetsuka et al. | |
| 2013/0255239 A1 | | 10/2013 | Miki | |
| 2014/0174236 A1 | | 6/2014 | Nakakura et al. | |
| 2016/0264213 A1 | | 9/2016 | Swanson et al. | |

FOREIGN PATENT DOCUMENTS

| | | |
|---|---|---|
| CN | 103359246 | 10/2013 |
| CN | 103895804 | 7/2014 |
| DE | 4400641 | 3/1995 |
| GB | 800196 | 8/1958 |
| GB | 2154292 | 9/1985 |

\* cited by examiner

*Primary Examiner* — F Daniel Lopez
*Assistant Examiner* — Daniel S Collins
(74) *Attorney, Agent, or Firm* — Mori & Ward, LLP

(57) ABSTRACT

A bicycle operating device comprises a hydraulic cylinder, a piston, and an operating unit. The hydraulic cylinder includes a cylinder bore. The piston is provided in the cylinder bore and is movable relative to the hydraulic cylinder. The piston is configured to receive a pulling force to generate a hydraulic pressure to a bicycle hydraulic component. The operating unit is configured to actuate at least one bicycle component different from the bicycle hydraulic component.

28 Claims, 16 Drawing Sheets

BICYCLE OPERATING DEVICE

BACKGROUND OF THE INVENTION

Field of the Invention

The present invention relates to a bicycle operating device.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle operating device.

SUMMARY OF THE INVENTION

In accordance with a first aspect of the present invention, a bicycle operating device comprises a hydraulic cylinder, a piston, and an operating unit. The hydraulic cylinder includes a cylinder bore. The piston is provided in the cylinder bore and is movable relative to the hydraulic cylinder. The piston is configured to receive a pulling force to generate a hydraulic pressure to a bicycle hydraulic component. The operating unit is configured to actuate at least one bicycle component different from the bicycle hydraulic component.

With the bicycle operating device in accordance with the first aspect, the piston is configured to receive the pulling force to generate the hydraulic pressure to the bicycle hydraulic component. Accordingly, it is possible to easily ensure the strength of the piston and/or a member transmitting the pulling force to the piston compared with a piston configured to receive a pushing force. Furthermore, since the bicycle operating device comprises the operating unit, it is possible to operate the at least one bicycle component in addition to the bicycle hydraulic component.

In accordance with a second aspect of the present invention, the bicycle operating device according to the first aspect further comprises an operating member movable relative to the hydraulic cylinder in response to an operating force and configured to be coupled to the piston to transmit the operating force to the piston as the pulling force.

With the bicycle operating device in accordance with the second aspect, it is possible to convert the operating force to the pulling force via the operating member.

In accordance with a third aspect of the present invention, the bicycle operating device according to the first aspect further comprises an operating member configured to be pivotable between a rest position and an operated position relative to the hydraulic cylinder about a first pivot axis. The piston is configured to be moved toward the first pivot axis when the operating member is operated from the rest position to the operated position.

With the bicycle operating device in accordance with the third aspect, it is possible to simplify a construction in which the piston configured to receive the pulling force.

In accordance with a fourth aspect of the present invention, the bicycle operating device according to the third aspect is configured so that the operating member is movable relative to the hydraulic cylinder between a rest position and an operated position. The piston is configured to receive the pulling force when the operating member is operated from the rest position to the operated position.

With the bicycle operating device in accordance with the fourth aspect, it is possible to apply the pulling force to the piston by moving the operating member from the rest position to the operated position.

In accordance with a fifth aspect of the present invention, the bicycle operating device according to the third or fourth aspect further comprises a piston rod configured to couple the operating member to the piston. The piston is movable relative to the hydraulic cylinder in a movement direction. The piston rod is movable relative to the hydraulic cylinder in the movement direction together with the piston.

With the bicycle operating device in accordance with the fifth aspect, it is possible to apply the pulling force to the piston via the piston rod.

In accordance with a sixth aspect of the present invention, the bicycle operating device according to the fifth aspect is configured so that the piston rod is movable relative to the hydraulic cylinder in the movement direction together with the piston so that an orientation of the piston rod is constant relative to the piston.

With the bicycle operating device in accordance with the sixth aspect, it is possible to reduce a space in which the piston rod moves, allowing a surrounding space of the piston rod to be utilized.

In accordance with a seventh aspect of the present invention, the bicycle operating device according to the sixth aspect is configured so that the piston rod includes a center axis, a first rod end portion, and a second rod end portion. The first rod end portion is coupled to the piston. The second rod end portion is opposite to the first rod end portion along the center axis. The piston rod is movable relative to the hydraulic cylinder in the movement direction together with the piston so that the center axis is parallel to the movement direction.

With the bicycle operating device in accordance with the seventh aspect, it is possible to reduce a space in which the piston rod moves, allowing a surrounding space of the piston rod to be utilized.

In accordance with an eighth aspect of the present invention, the bicycle operating device according to any one of the fifth to seventh aspects is configured so that the operating member includes a first end portion and a second end portion opposite to the first end portion. The first end portion of the operating member is configured to be coupled to the piston rod.

With the bicycle operating device in accordance with the eighth aspect, it is possible to convert the operating force to the pulling force with a simple structure.

In accordance with a ninth aspect of the present invention, the bicycle operating device according to the eighth aspect is configured so that the first pivot axis is provided between the first end portion and the second end portion.

With the bicycle operating device in accordance with the ninth aspect, it is possible to convert the operating force to the pulling force with reducing a size of the first end portion of the operating member compared with a structure in which the first pivot axis is provided at the first end portion.

In accordance with a tenth aspect of the present invention, the bicycle operating device according to the eighth or ninth aspect further comprises a support member configured to pivotally support the operating member about the first pivot axis.

With the bicycle operating device in accordance with the tenth aspect, it is possible to support the operating member with a simple structure.

In accordance with an eleventh aspect of the present invention, the bicycle operating device according to the tenth aspect is configured so that the piston rod includes a center axis, a first rod end portion, and a second rod end portion. The first rod end portion is coupled to the piston. The second rod end portion is opposite to the first rod end portion along the center axis. The support member is configured to support the second rod end portion to be movable relative to the hydraulic cylinder in the movement direction.

With the bicycle operating device in accordance with the eleventh aspect, it is possible to stabilize movement of the piston rod.

In accordance with a twelfth aspect of the present invention, the bicycle operating device according to the eleventh aspect further comprises a coupling member configured to be coupled to the second rod end portion. The support member is configured to support the coupling member to be movable relative to the support member in the movement direction.

With the bicycle operating device in accordance with the twelfth aspect, it is possible to effectively stabilize the movement of the piston rod via the coupling member.

In accordance with a thirteenth aspect of the present invention, the bicycle operating device according to the twelfth aspect is configured so that the support member includes a first guide groove and a second guide groove. The first guide groove extends in the movement direction. The second guide groove extends in the movement direction. The coupling member includes a first guide end portion and a second guide end portion. The first guide end portion is provided in the first guide groove. The second guide end portion is opposite to the first guide end portion and is provided in the second guide groove.

With the bicycle operating device in accordance with the thirteenth aspect, it is possible to effectively stabilize the movement of the piston rod with a simple structure such as the first guide groove and the second guide groove.

In accordance with a fourteenth aspect of the present invention, the bicycle operating device according to the twelfth or thirteenth aspect is configured so that the coupling member includes a threaded hole. The piston rod includes an externally threaded portion provided on an outer periphery of the second rod end portion and configured to be engaged with the threaded hole.

With the bicycle operating device in accordance with the fourteenth aspect, it is possible to easily adjust a position of the piston rod relative to the coupling member by rotating the piston rod relative to the coupling member.

In accordance with a fifteenth aspect of the present invention, the bicycle operating device according to the fourteenth aspect is configured so that the piston rod includes an adjustment operating portion configured to be operated by a user to rotate the piston rod relative to the coupling member.

With the bicycle operating device in accordance with the fifteenth aspect, it is possible to easily adjust the position of the piston rod relative to the coupling member via the adjustment operating portion.

In accordance with a sixteenth aspect of the present invention, the bicycle operating device according to the fifteenth aspect is configured so that the adjustment operating portion is provided at the second rod end portion.

With the bicycle operating device in accordance with the sixteenth aspect, it is possible to easily access the adjustment operating portion via a space which surrounds the second rod end portion in the operating member.

In accordance with a seventeenth aspect of the present invention, the bicycle operating device according to any one of the eleventh to sixteenth aspects is configured so that the support member is pivotable relative to the hydraulic cylinder about a second pivot axis non-parallel to the first pivot axis.

With the bicycle operating device in accordance with the seventeenth aspect, it is possible to utilize a pivotal movement of the support member to actuate a bicycle component.

In accordance with an eighteenth aspect of the present invention, the bicycle operating device according to the seventeenth aspect is configured so that the second pivot axis coincides with the center axis of the piston rod.

With the bicycle operating device in accordance with the eighteenth aspect, it is possible to smooth the pivotal movement of the support member.

In accordance with a nineteenth aspect of the present invention, the bicycle operating device according to the seventeenth or eighteenth aspect is configured so that the support member is configured to be coupled to the operating unit to transmit a pivotal movement of the support member to the operating unit. The operating unit is configured to actuate the at least one bicycle component via a control cable in response to the pivotal movement of the support member.

With the bicycle operating device in accordance with the nineteenth aspect, it is possible to utilize the pivotal movement of the support member to actuate the at least one bicycle component via the operating unit.

In accordance with a twentieth aspect of the present invention, the bicycle operating device according to the nineteenth aspect further comprises an additional operating member movable relative to the hydraulic cylinder and configured to be coupled to the operating unit. The operating unit is configured to move the control cable relative to the hydraulic cylinder in a first operating direction in response to the pivotal movement of the support member. The operating unit is configured to move the control cable relative to the hydraulic cylinder in a second operating direction which is different from the first operating direction in response to a movement of the additional operating member.

With the bicycle operating device in accordance with the twentieth aspect, it is possible to respectively move the control cable in the first and second operating directions using the support member and the additional operating member.

In accordance with a twenty-first aspect of the present invention, the bicycle operating device according to any one of the first to twentieth aspects is configured so that the hydraulic cylinder is configured to be at least partially provided in a handlebar.

With the bicycle operating device in accordance with the twenty-first aspect, it is possible to utilize an inside of the handlebar as a part of a space in which the bicycle operating device is provided.

In accordance with a twenty-second aspect of the present invention, the bicycle operating device according to the twenty-first aspect further comprises a hydraulic reservoir configured to be in communication with the hydraulic cylinder. The hydraulic reservoir is configured to be at least partially provided in the handlebar.

With the bicycle operating device in accordance with the twenty-second aspect, it is possible to utilize an inside of the handlebar as a part of a space in which the bicycle operating device is provided.

In accordance with a twenty-third aspect of the present invention, the bicycle operating device according to any one of the first to twenty-second aspects is configured so that the operating unit is configured to be provided outside a handlebar.

With the bicycle operating device in accordance with the twenty-third aspect, it is possible to improve the design possibility of the operating unit.

In accordance with a twenty-fourth aspect of the present invention, the bicycle operating device according to any one of the first to twenty-third aspects is configured so that the operating unit includes an electrical switch.

With the bicycle operating device in accordance with the twenty-fourth aspect, it is possible to actuate an electrical bicycle component using the electrical switch.

In accordance with a twenty-fifth aspect of the present invention, a bicycle operating device comprises a hydraulic cylinder, a piston, and a piston rod. The hydraulic cylinder includes a cylinder bore. The piston is provided in the cylinder bore and is movable relative to the hydraulic cylinder in a movement direction. The piston is configured to receive a pulling force to generate a hydraulic pressure to a bicycle hydraulic component. The piston rod is operatively coupled to the piston and is movable relative to the hydraulic cylinder in the movement direction together with the piston so that an orientation of the piston rod is constant relative to the piston.

With the bicycle operating device in accordance with the twenty-fifth aspect, the piston is configured to receive the pulling force to generate the hydraulic pressure to the bicycle hydraulic component. Accordingly, it is possible to easily ensure the strength of the piston and/or a member transmitting the pulling force to the piston compared with a piston configured to receive a pushing force. Furthermore, the piston rod is movable relative to the hydraulic cylinder in the movement direction together with the piston so that an orientation of the piston rod is constant relative to the piston. Accordingly, it is possible to reduce a space in which the piston rod moves, allowing a surrounding space of the piston rod to be utilized.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
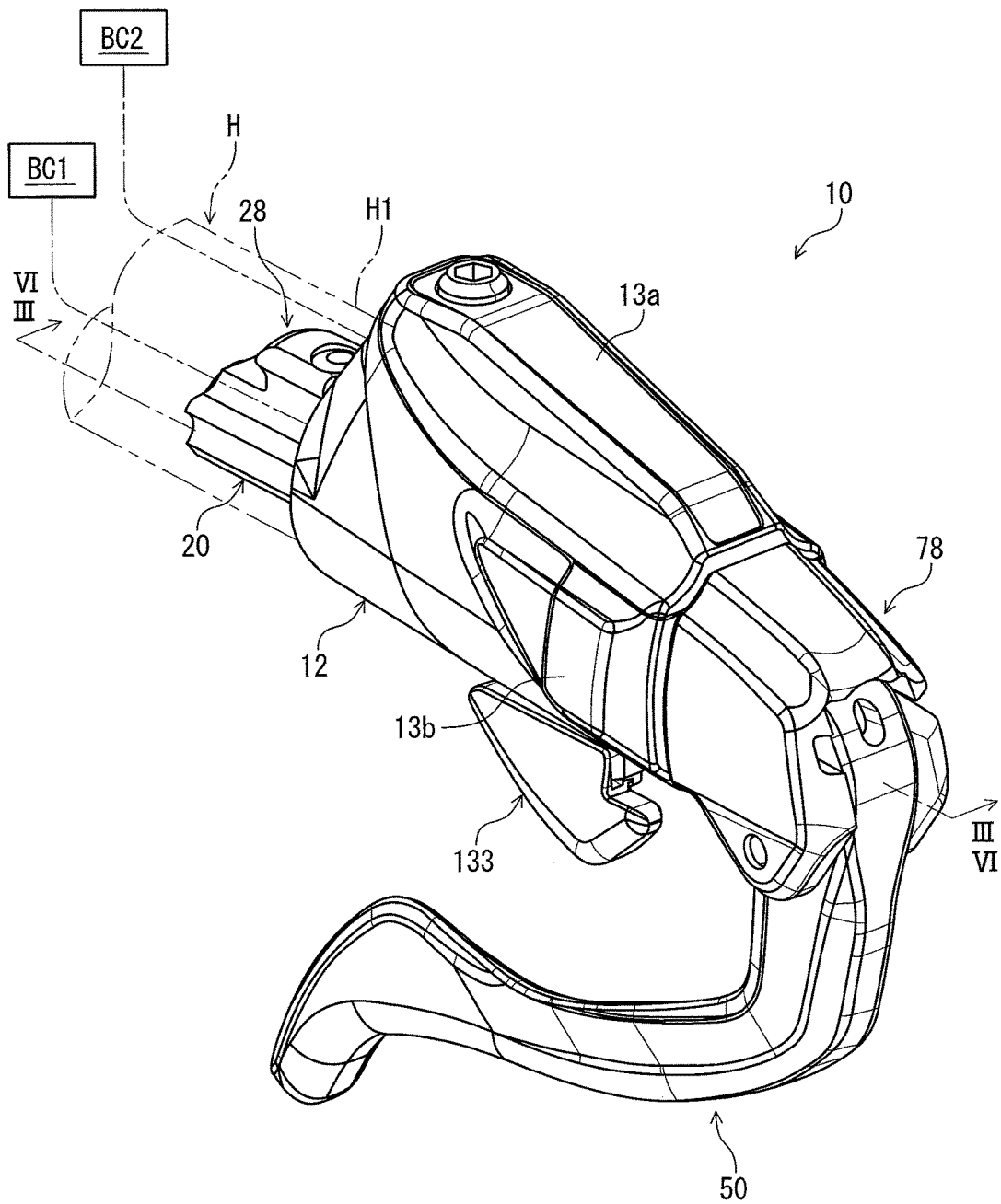
FIG. 1 is a perspective view of a bicycle operating device in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle operating device 10 in accordance with a first embodiment is configured to be mounted to an end H1 of a handlebar H such as a time trial handlebar and a bull horn handlebar. Namely, the bicycle operating device 10 is constructed as a bar-end type operating device. However, the bicycle operating device 10 can be mounted to other type of handlebars if needed and/or desired.

The bicycle operating device 10 is configured to be operated by a user (e.g., a rider) to actuate a bicycle hydraulic component BC1 such as a hydraulic brake device. In the illustrated embodiment, the bicycle operating device 10 is a right hand side control device configured to be operated by the rider's right hand to actuate the bicycle hydraulic component BC1. However, the construction of the bicycle operating device 10 can be applied to a left hand side control device if needed and/or desired.

In the present application, the following directional terms "front", "rear", "forward", "rearward", "left", "right", "transverse", "upward" and "downward" as well as any other similar directional terms refer to those directions which are determined on the basis of the user (e.g., the rider) who sits on a saddle (not shown) of a bicycle with facing the handlebar H. Accordingly, these terms, as utilized to describe the bicycle operating device 10, should be interpreted relative to the bicycle equipped with the bicycle operating device 10 as used in an upright riding position on a horizontal surface.

Figure 2:
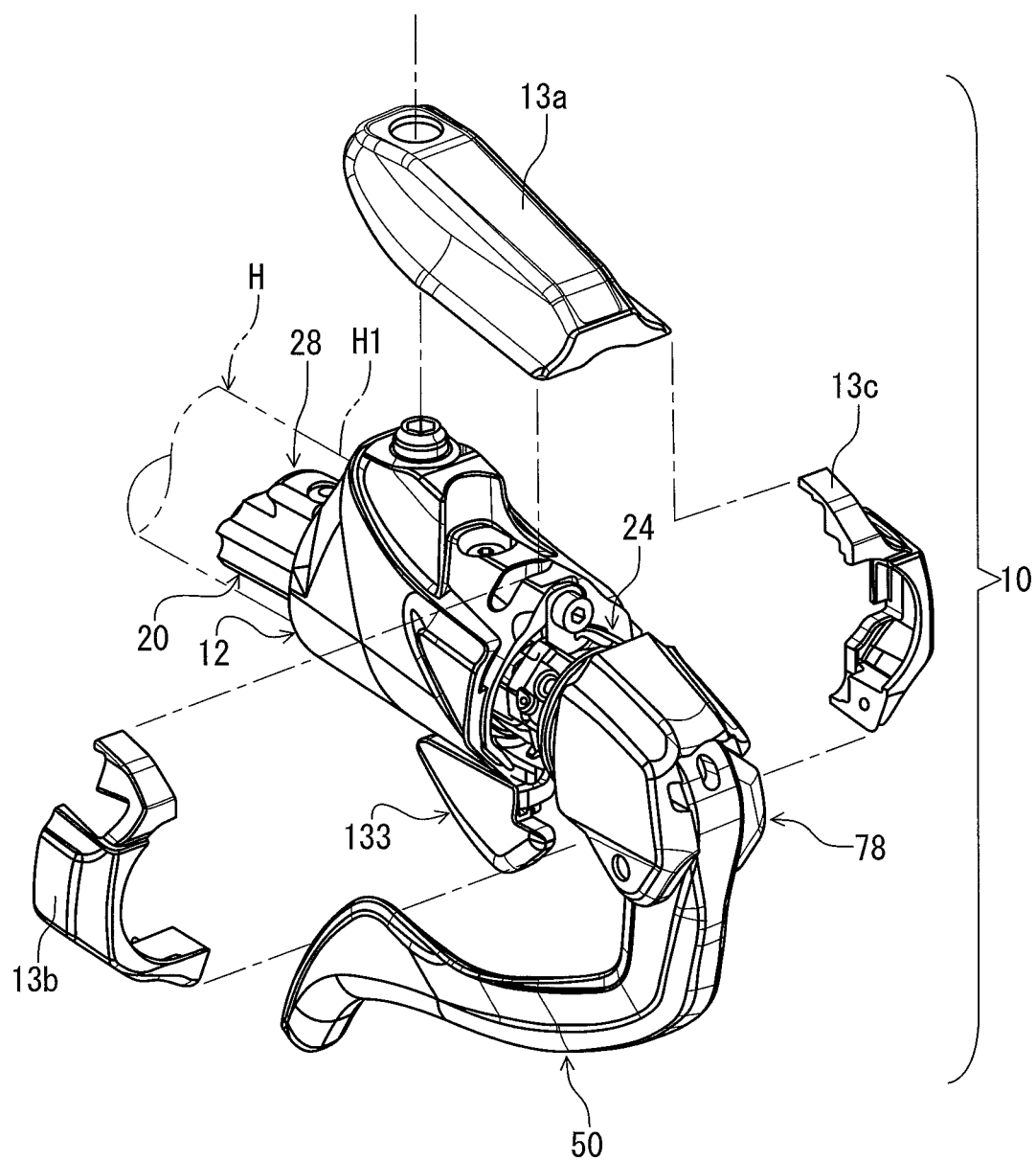
FIG. 2 is an exploded perspective view of the bicycle operating device illustrated in FIG. 1.

As seen in FIGS. 1 and 2, the bicycle operating device 10 comprises a base member 12, a first cover 13a, a second cover 13b, and a third cover 13c. The base member 12 is configured to be attached to the handlebar H. While the base member 12 is configured to be attached to the end H1 of the handlebar H in the illustrated embodiment, the base member 12 can be attached to other parts of the handlebar H if needed and/or desired. The first cover 13a, the second cover 13b, and the third cover 13c are attached to the base member 12. At least one of the first to third covers 13a to 13c can be omitted from the bicycle operating device 10 if needed and/or desired. At least one of the first to third covers 13a to 13c can be integrally provided with the base member 12 as a single unitary member if needed and/or desired.

Figure 3:
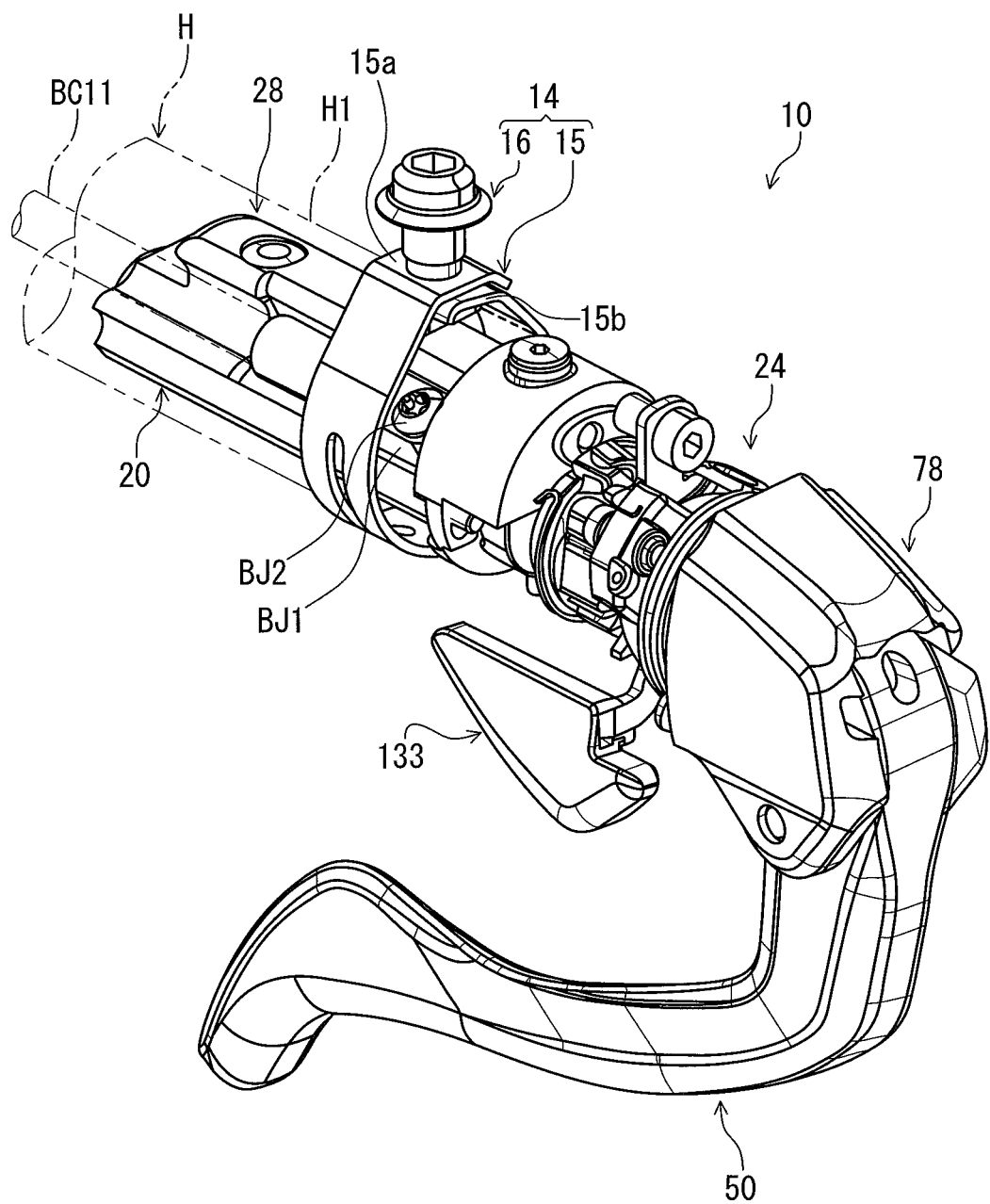
FIG. 3 is a perspective view of the bicycle operating device illustrated in FIG. 1 with a base member and covers omitted.

In FIG. 3, the base member 12 and the first to third covers 13a to 13c are omitted. As seen in FIG. 3, the bicycle operating device 10 comprises a coupling structure 14 configured to couple the base member 12 to the end H1 of the handlebar H. The coupling structure 14 includes an engagement member 15 and a tightening structure 16. The tightening structure 16 is configured to displace the engagement member 15 toward the base member 12 to clamp the handlebar H between the base member 12 and the engagement member 15 in response to tightening of the tightening structure 16.

The engagement member 15 has an annular shape. The end H1 of the handlebar H extends through the engagement member 15 when the bicycle operating device 10 is mounted to the handlebar H. The engagement member 15 includes a first end 15a and a second end 15b. The tightening structure 16 is configured to displace the first end 15a and the second end 15b toward the base member 12 to clamp the handlebar H between the base member 12 and the engagement member 15 in response to tightening of the tightening structure 16.

Figure 4:
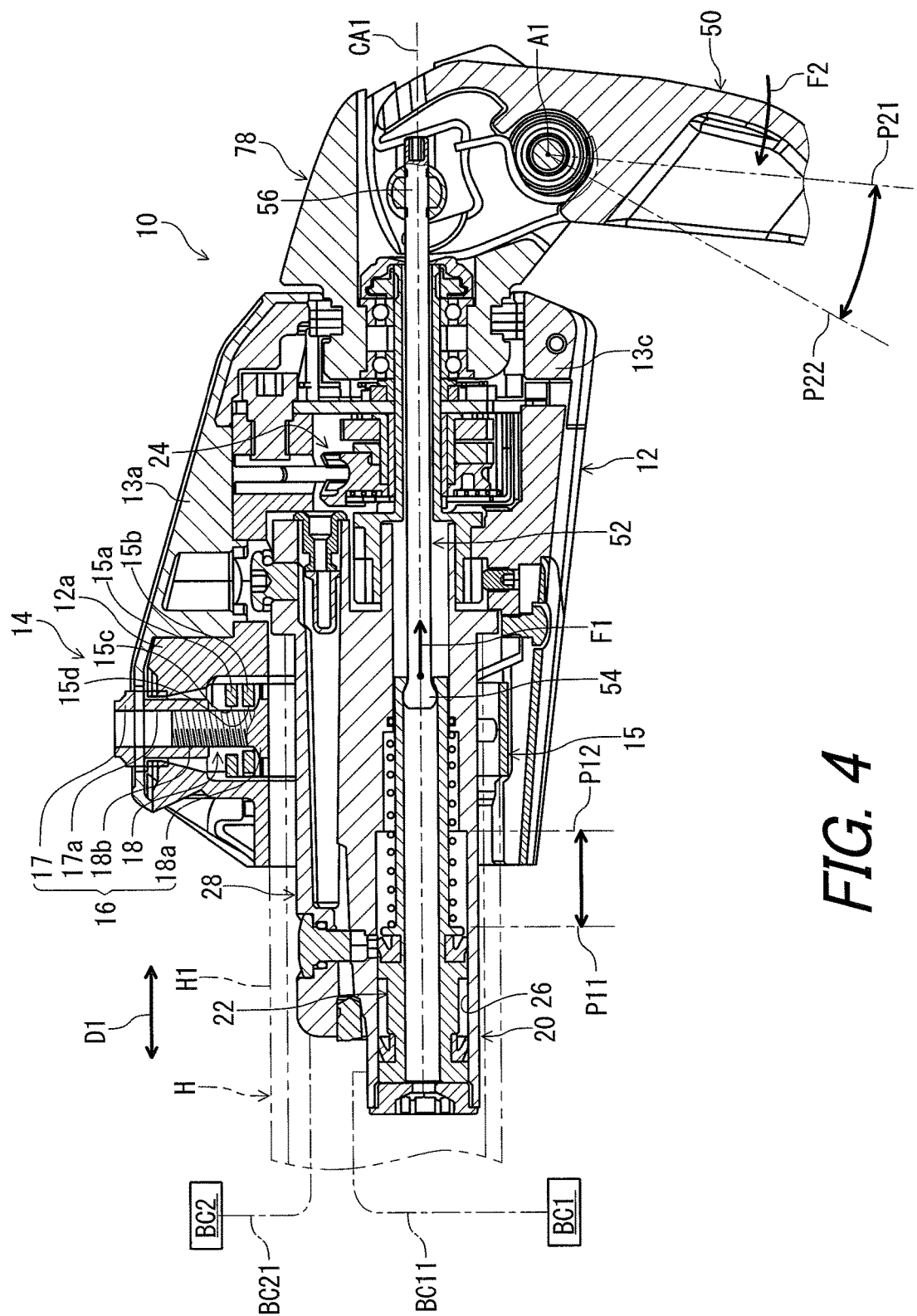
FIG. 4 is a cross-sectional view of the bicycle operating device taken along line III-III of FIG. 1.

As seen in FIG. 4, the base member 12 includes a clamping part 12a. The tightening structure 16 is mounted to the clamping part 12a. The tightening structure 16 includes a first member 17 and a second member 18. The first member 17 includes a threaded hole 17a. The second member 18 includes a base part 18a and a thread bolt 18b. The base part 18a is engaged with the engagement member 15 to prevent the second member 18 from rotating relative to the engagement member 15. The thread bolt 18b extends from the base part 18a and is engaged with the threaded hole 17a.

The first end 15a includes a first hole 15c. The second end 15b includes a second hole 15d. The second member 18 extends through the first hole 15c and the second hole 15d. Rotation of the first member 17 relative to the base member 12 changes a position of the second member 18 relative to the base member 12. When the first member 17 is tightened, the second member 18 moves toward the first member 17, moving the engagement member 15 toward the first member 17. Accordingly, the end H1 of the handlebar H is clamped between the clamping part 12a and the engagement member 15. Thus, it is possible to secure the base member 12 to the end H1 of the handlebar H.

As seen in FIG. 4, the bicycle operating device 10 comprises a hydraulic cylinder 20, a piston 22, and an operating unit 24. The hydraulic cylinder 20 includes a cylinder bore 26. The piston 22 is provided in the cylinder bore 26 and is movable relative to the hydraulic cylinder 20. The hydraulic cylinder 20 is configured to be connected to the bicycle hydraulic component BC1 via a hydraulic hose BC11. In the illustrated embodiment, the hydraulic cylinder 20 is provided in the base member 12. While the hydraulic cylinder 20 is a separate member from the base member 12 in the illustrated embodiment, the hydraulic cylinder 20 can be integrally provided with the base member 12 as a single unitary member if needed and/or desired.

As seen in FIG. 4, the operating unit 24 is configured to actuate at least one bicycle component different from the bicycle hydraulic component BC1. In the illustrated embodiment, the operating unit 24 is configured to actuate a bicycle component BC2 such as a shifting device. The operating unit 24 is operatively connected to the bicycle component BC2 via a control cable BC21 such as a Bowden cable.

Figure 5:
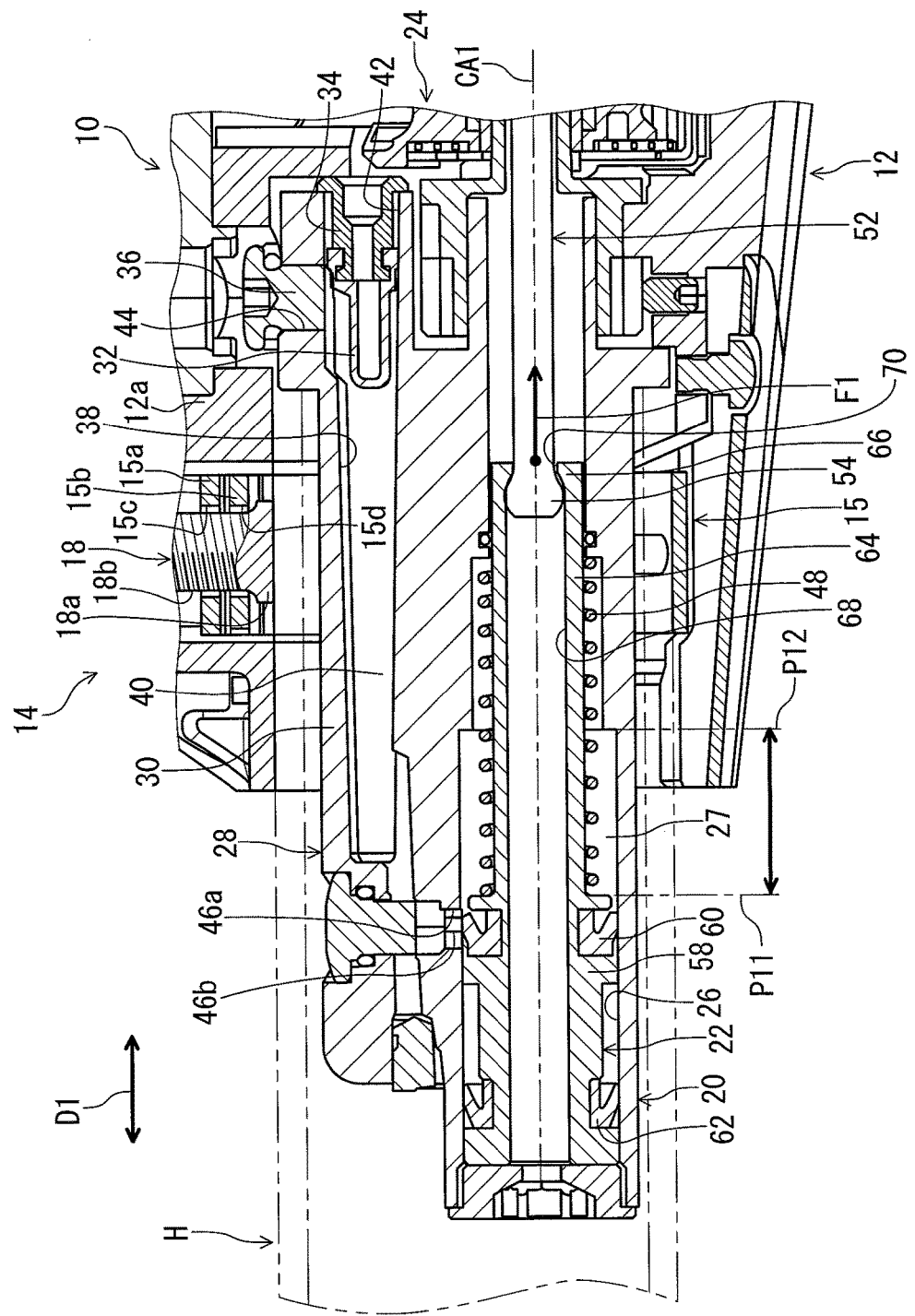
FIG. 5 is an enlarged cross-sectional view of the bicycle operating device illustrated in FIG. 1.

The piston 22 is configured to receive a pulling force F1 to generate a hydraulic pressure to the bicycle hydraulic component BC1. In the illustrated embodiment, as seen in FIG. 5, the piston 22 is movable relative to the hydraulic cylinder 20 between an initial position P11 and an actuated position P12. A hydraulic chamber 27 is defined by the hydraulic cylinder 20 and the piston 22 in the cylinder bore 26. The hydraulic chamber 27 is configured to be connected to the bicycle hydraulic component BC1 via the hydraulic hose BC11. As seen in FIG. 3, the hydraulic cylinder 20 is configured to be connected to the hydraulic hose BC11 via a banjo BJ1 and a banjo attachment bolt BJ2.

As seen in FIG. 5, the bicycle operating device 10 further comprises a hydraulic reservoir 28 configured to be in communication with the hydraulic cylinder 20. Specifically, the hydraulic reservoir 28 includes a reserve tank 30, a flexible diaphragm 32, a seal plug 34, and a bleed plug 36. The reserve tank 30 includes an inner space 38. The flexible diaphragm 32 is provided in the inner space 38. A reserve chamber 40 is defined by the reserve tank 30 and the flexible diaphragm 32 in the inner space 38. The reserve tank 30 includes a first hole 42 and a second hole 44. The seal plug 34 is threadedly engaged with the first hole 42. The flexible diaphragm 32 is attached to the seal plug 34. The bleed plug 36 is threadedly engaged with the second hole 44. The hydraulic reservoir 28 includes connecting holes 46a and 46b. The reserve chamber 40 is in communication with the hydraulic chamber 27 via the connecting hole 46a in an initial state where the piston is positioned at the initial position P11.

As seen in FIG. 5, the hydraulic cylinder 20 is configured to be at least partially provided in the handlebar H. While the hydraulic cylinder 20 is configured to be partially provided in the handlebar H in the illustrated embodiment, the hydraulic cylinder 20 can be configured to be entirely provided in the handlebar H if needed and/or desired. Since the hydraulic cylinder 20 is configured to be at least partially provided in the handlebar H, it is possible to utilize an inside of the handlebar H as a part of a space in which the bicycle operating device 10 is provided.

The hydraulic reservoir 28 is configured to be at least partially provided in the handlebar H. While the hydraulic reservoir 28 is configured to be partially provided in the handlebar H in the illustrated embodiment, the hydraulic reservoir 28 can be configured to be entirely provided in the handlebar H if needed and/or desired. Since the hydraulic reservoir 28 is configured to be at least partially provided in the handlebar H, it is possible to utilize an inside of the handlebar H as a part of a space in which the bicycle operating device 10 is provided.

The piston 22 is configured to be at least partially provided in the handlebar H. In the illustrated embodiment, the piston 22 is entirely provided in the handlebar H in the initial state where the piston 22 is positioned at the initial position P11. The piston 22 is partially provided in the handlebar H in the actuated state where the piston 22 is positioned at the actuated position P12. However, the piston 22 can be partially provided in the handlebar H in the initial state if needed and/or desired. The piston 22 can be entirely provided in the handlebar H in the actuated state if needed and/or desired.

As seen in FIG. 4, the operating unit 24 is configured to be provided outside the handlebar H. However, the operating unit 24 can be partially provided in the handlebar H if needed and/or desired. Since the operating unit 24 is configured to be provided outside the handlebar H, it is possible to improve the design possibility of the operating unit 24.

As seen in FIG. 5, the bicycle operating device 10 further comprises a piston biasing member 48 configured to bias the piston 22 toward the initial position P11. The piston biasing member 48 is provided in the hydraulic cylinder 20. Specifically, the piston biasing member 48 is provided in the hydraulic chamber 27. The piston biasing member 48 comprises a coil spring. The piston 22 extends through the piston biasing member 48.

As seen in FIG. 4, the bicycle operating device 10 further comprises an operating member 50 movable relative to the hydraulic cylinder 20 in response to an operating force F2. The operating member 50 is configured to be coupled to the piston 22 to transmit the operating force F2 to the piston 22 as the pulling force F1. Accordingly, it is possible to convert the operating force to the pulling force F1 via the operating member 50.

The operating member 50 is movable relative to the hydraulic cylinder 20 between a rest position P21 and an operated position P22. In the illustrated embodiment, the operating member 50 is pivotable between a rest position P21 and an operated position P22 relative to the hydraulic cylinder 20 about a first pivot axis A1. Accordingly, it is possible to simplify a construction in which the piston 22 configured to receive the pulling force F1. In the illustrated embodiment, the operating member 50 is pivotable relative to the base member 12 about the first pivot axis A1.

The piston 22 is configured to be moved toward the first pivot axis A1 when the operating member 50 is operated from the rest position P21 to the operated position P22. The piston 22 is configured to receive the pulling force F1 when the operating member 50 is operated from the rest position P21 to the operated position P22. Accordingly, it is possible to apply the pulling force F1 to the piston 22 by moving the operating member 50 from the rest position P21 to the operated position P22.

In the present application, the term "rest position" as used herein refers to a position at which a movable part such as the operating member 50 remains stationary in a state where the movable part is not operated by the user. The term "operated position" as used herein refers to a position at which the movable part has been operated by the user to perform the operation of a bicycle component such as the bicycle hydraulic component BC1.

As seen in FIG. 4, the piston 22 is positioned at the initial position P11 in a rest state where the operating member 50 is positioned at the rest position P21. The piston 22 is positioned at the actuated position P12 in an operated state where the operating member 50 is positioned at the operated position P22. The piston 22 moves relative to the hydraulic cylinder 20 from the initial position P11 toward the actuated position P12 when the operating member 50 pivots from the rest position P21 toward the operated position P22. The actuated position P12 is closer to the first pivot axis A1 than the initial position P11.

As seen in FIG. 4, the bicycle operating device 10 further comprises a piston rod 52 configured to couple the operating member 50 to the piston 22. The piston 22 is movable relative to the hydraulic cylinder 20 in a movement direction D1. The piston rod 52 is movable relative to the hydraulic cylinder 20 in the movement direction D1 together with the piston 22. Accordingly, it is possible to apply the pulling force to the piston 22 via the piston rod 52.

The piston rod 52 includes a center axis CA1, a first rod end portion 54, and a second rod end portion 56. The first rod end portion 54 is coupled to the piston 22. The second rod end portion 56 is opposite to the first rod end portion 54 along the center axis CA1. Accordingly, it is possible to reduce a space in which the piston rod 52 moves, allowing a surrounding space of the piston rod 52 to be utilized.

As seen in FIG. 5, the piston rod 52 is operatively coupled to the piston 22. In the illustrated embodiment, the piston rod 52 is pivotally coupled to the piston 22 via the first rod end portion 54. Specifically, the piston 22 includes a piston body 58, a first seal element 60, a second seal element 62, a support tube 64, and a restricting portion 66. The piston body 58 has a tubular shape and extends in the movement direction D1. The first seal element 60 and the second seal element 62 are attached to the piston body 58. The second seal element 62 is spaced apart from the first seal element 60 in the movement direction D1.

The support tube 64 extends from the piston body 58 in the movement direction D1 to support the piston biasing member 48. A maximum outer diameter of the support tube 64 is smaller than a maximum outer diameter of the piston body 58. The restricting portion 66 has an annular shape and is provided at an end of the support tube 64. The piston 22 includes a first through-hole 68 extending in the movement direction D1. The restricting portion 66 includes a second through-hole 70 connected with the first through-hole 68. A minimum diameter of the second through-hole 70 is smaller than a minimum diameter of the first through-hole 68.

Figure 6:
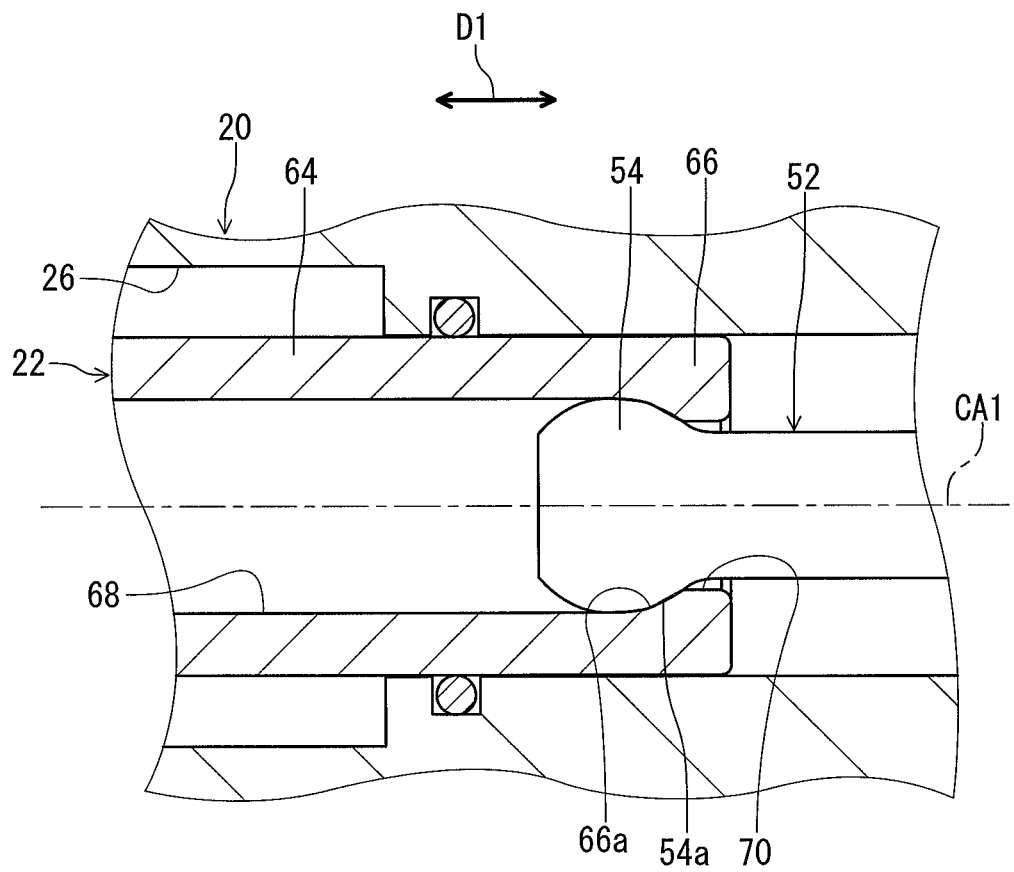
FIG. 6 is an enlarged cross-sectional view of the bicycle operating device illustrated in FIG. 1.

As seen in FIG. 6, the first rod end portion 54 has a substantially spherical shape. A maximum outer diameter of the first rod end portion 54 is equal to or smaller than the minimum diameter of the first through-hole 68 and is larger than the minimum diameter of the second through-hole 70. The first rod end portion 54 includes a first curved surface 54a. The restricting portion 66 includes a second curved surface 66a. In the illustrated embodiment, the first curved surface 54a has a convex shape, and the second curved surface 66a has a concave shape.

The first curved surface 54a of the first rod end portion 54 is in contact with the second curved surface 66a of the restricting portion 66. Thus, the piston rod 52 is rotatable relative to the piston 22 about the center axis CA1 and is pivotable relative to the piston 22 about the first rod end portion 54. However, the piston rod 52 can be secured to the piston 22 if needed and/or desired. Furthermore, while the piston rod 52 is a separate member from the piston 22 in the illustrated embodiment, the piston rod 52 can be integrally provided with the piston 22 as a single unitary member if needed and/or desired.

As seen in FIG. 5, the piston rod 52 is movable relative to the hydraulic cylinder 20 in the movement direction D1 together with the piston 22 so that an orientation of the piston rod 52 is constant relative to the piston 22. Accordingly, it is possible to reduce a space in which the piston rod 52 moves, allowing a surrounding space of the piston rod 52 to be utilized.

The piston rod 52 is made of a rigid material such as a metallic material. However, the piston rod 52 can have flexibility such that at least one of an election tolerance and the manufacturing tolerance of the bicycle operating device 10 is compensated. Furthermore, the orientation of the piston rod 52 can be substantially constant relative to the piston 22 when the piston rod 52 moves relative to the hydraulic cylinder 20 in the movement direction D1 together with the piston 22. For example, the orientation of the piston rod 52 can be changed relative to the piston 22 within a range in which at least one of the election tolerance and the manufacturing tolerance of the bicycle operating device 10 is compensated.

The piston rod 52 is movable relative to the hydraulic cylinder 20 in the movement direction D1 together with the piston 22 so that the center axis CA1 is parallel to the movement direction D1. However, the center axis CA1 can be substantially parallel to the movement direction D1 when the piston rod 52 moves relative to the hydraulic cylinder 20 in the movement direction D1 together with the piston 22.

For example, the center axis CA1 of the piston rod 52 can be angularly offset from the movement direction D1 within a range in which at least one of the election tolerance and the manufacturing tolerance of the bicycle operating device 10 is compensated.

Figure 7:
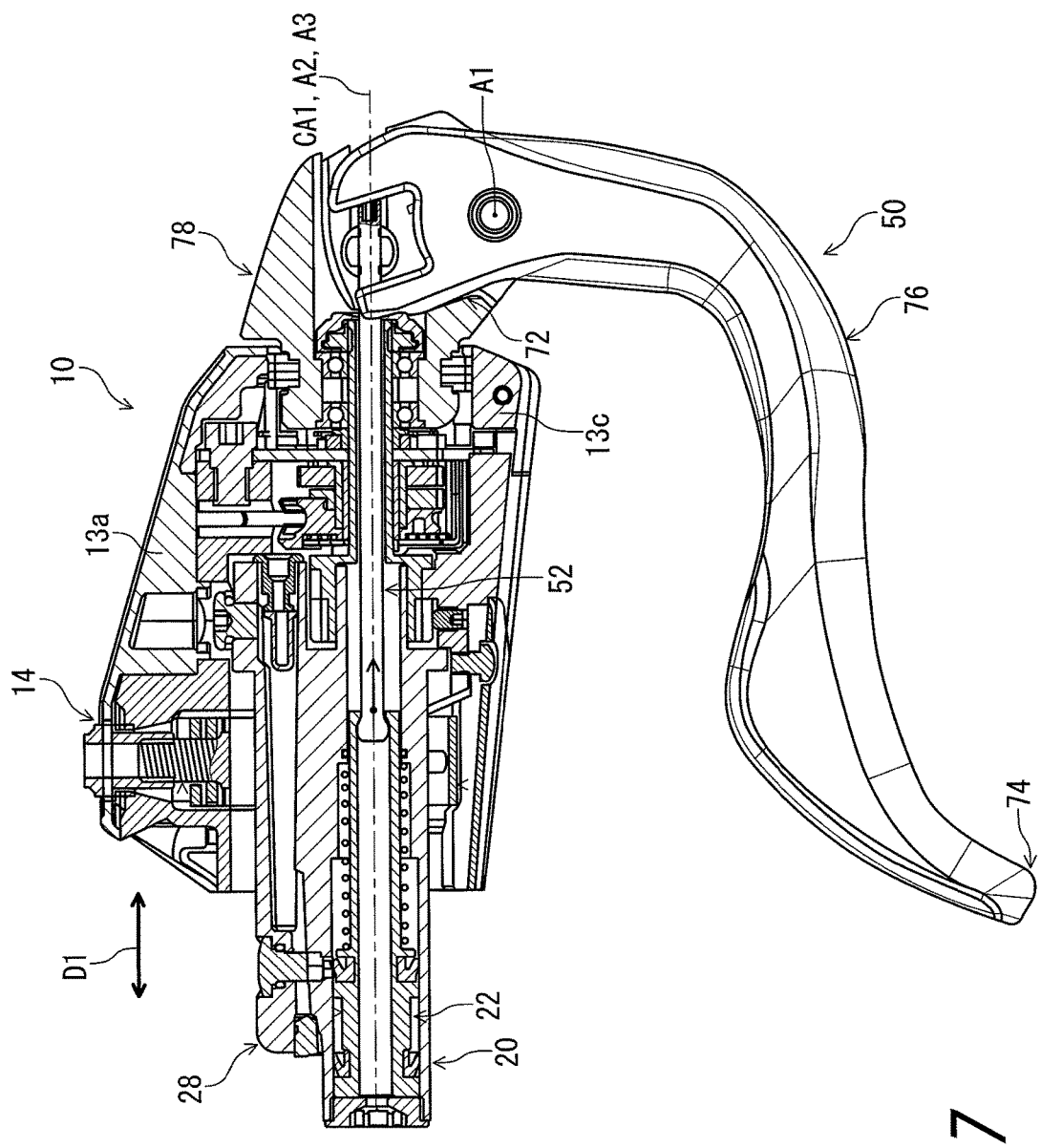
FIG. 7 is a cross-sectional view of the bicycle operating device taken along line VI-VI of FIG. 1 except for an operating member.

As seen in FIG. 7, the operating member 50 includes a first end portion 72 and a second end portion 74 opposite to the first end portion 72. The first end portion 72 of the operating member 50 is configured to be coupled to the piston rod 52. Accordingly, it is possible to convert the operating force to the pulling force F1 with a simple structure.

The first pivot axis A1 is provided between the first end portion 72 and the second end portion 74. Accordingly, it is possible to convert the operating force to the pulling force F1 with reducing a size of the first end portion 72 of the operating member 50 compared with a structure in which the first pivot axis is provided at the first end portion. In the illustrated embodiment, the first pivot axis A1 is provided between the first end portion 72 and the second end portion 74 when viewed along the first pivot axis A1.

In the illustrated embodiment, the first pivot axis A1 is closer to the first end portion 72 than to the second end portion 74 when viewed along the first pivot axis A1. The operating member 50 includes a grip portion 76 configured to be griped by the user to actuate the bicycle hydraulic component BC1. The grip portion 76 is provided between the first end portion 72 and the second end portion 74. The grip portion 76 is provided between the first pivot axis A1 and the second end portion 74 when viewed along the first pivot axis A1. The first pivot axis A1 is provided between the first end portion 72 and the grip portion 76 when viewed along the first pivot axis A1.

Figure 8:
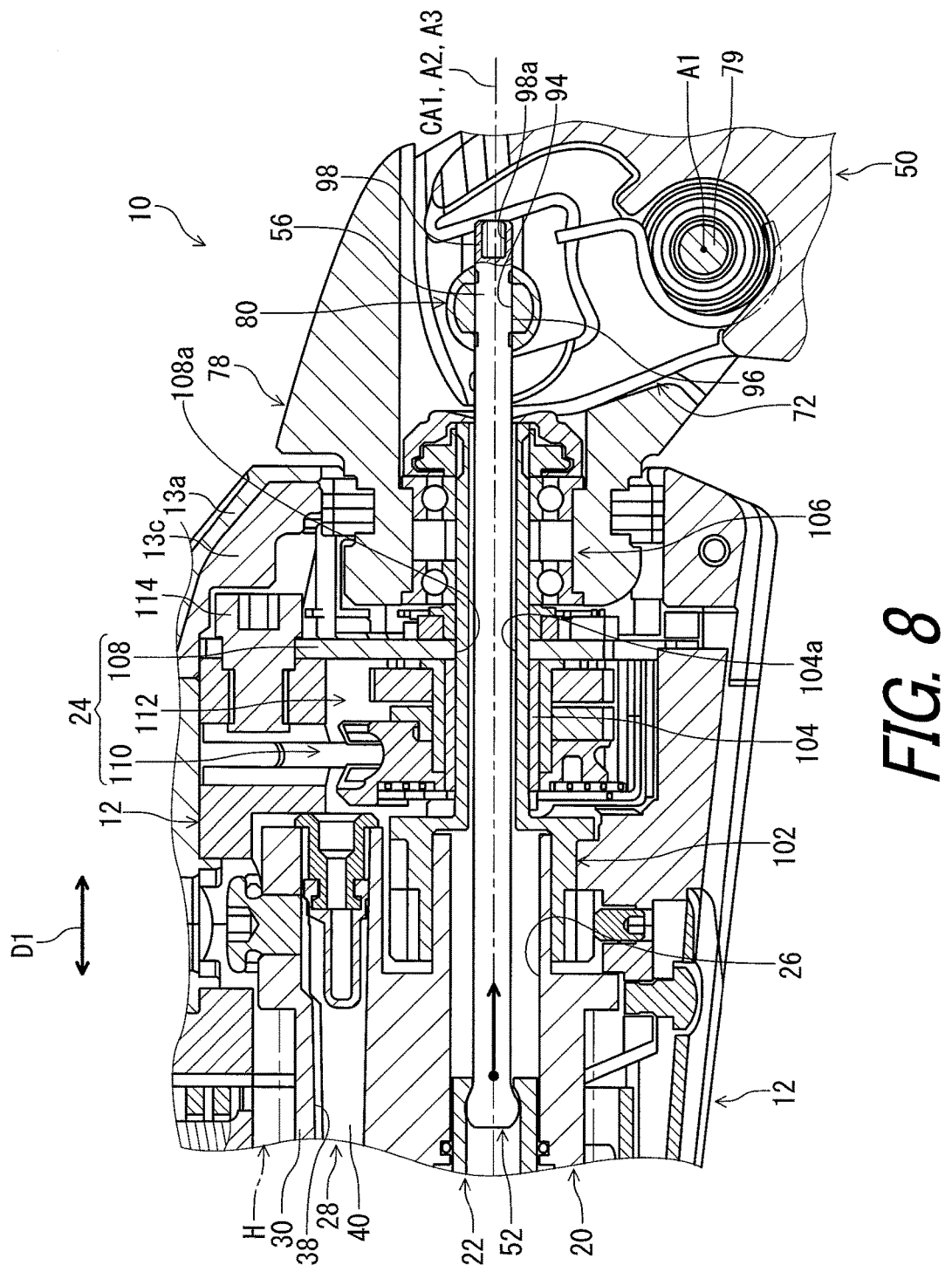
FIG. 8 is an enlarged cross-sectional view of the bicycle operating device illustrated in FIG. 1.

As seen in FIG. 8, the bicycle operating device 10 further comprises a support member 78 configured to pivotally support the operating member 50 about the first pivot axis A1. Accordingly, it is possible to support the operating member 50 with a simple structure. In the illustrated embodiment, the support member 78 is configured to support the second rod end portion 56 to be movable relative to the hydraulic cylinder 20 in the movement direction D1. Accordingly, it is possible to stabilize movement of the piston rod 52.

In the illustrated embodiment, the bicycle operating device 10 comprises a pivot shaft 79 mounted to the support member 78 to support the operating member 50. The support member 78 is configured to pivotally support the operating member 50 about the first pivot axis A1 via the pivot shaft 79.

The bicycle operating device 10 further comprises a coupling member 80 configured to be coupled to the second rod end portion 56. The support member 78 is configured to support the coupling member 80 to be movable relative to the support member 78 in the movement direction D1. Accordingly, it is possible to effectively stabilize the movement of the piston rod 52 via the coupling member 80.

Figure 9:
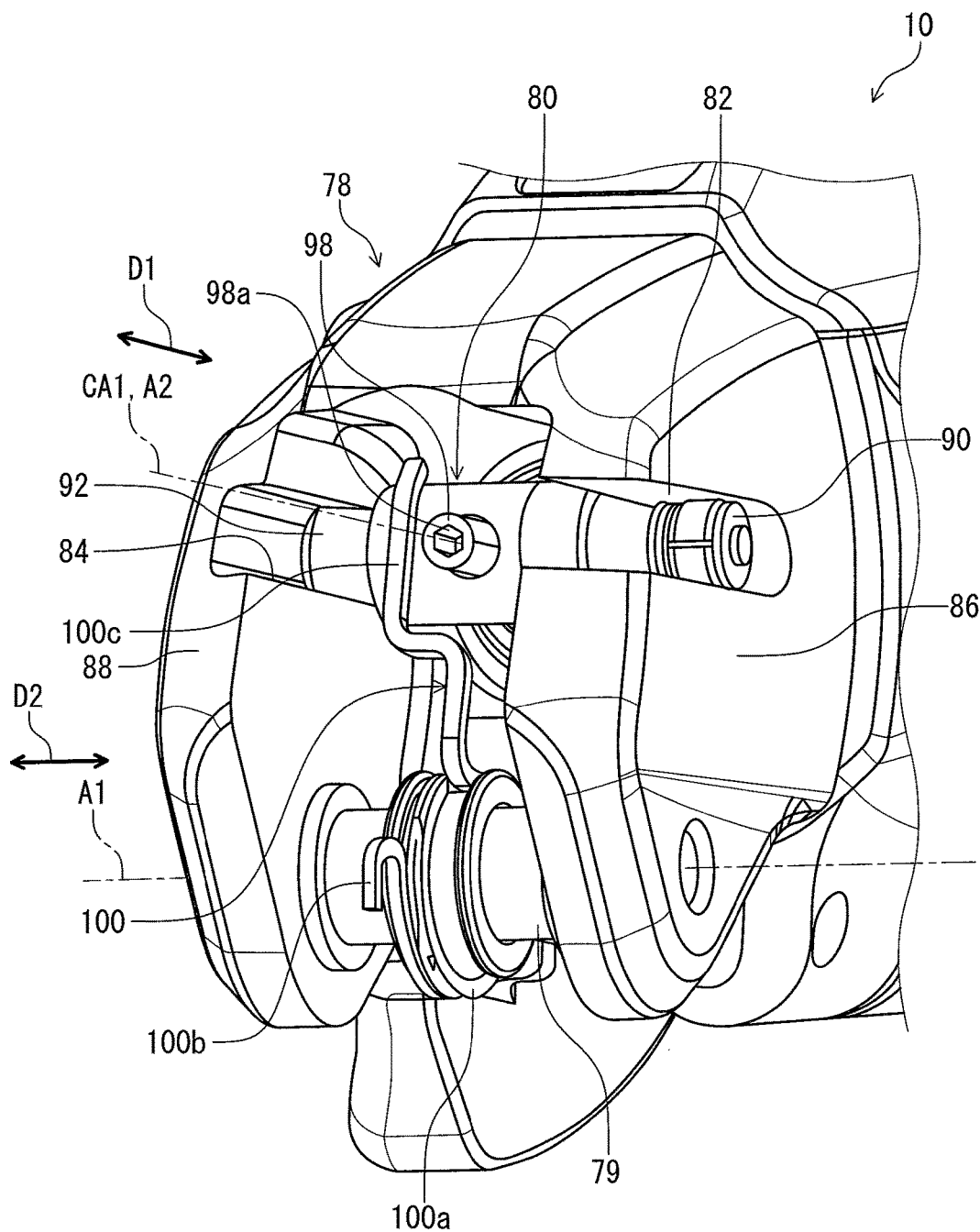
FIG. 9 is a partial perspective view of the bicycle operating device illustrated in FIG. 1 with the operating member omitted.

In FIG. 9, the operating member 50 is omitted from the bicycle operating device 10. As seen in FIG. 9, the support member 78 includes a first guide groove 82 and a second guide groove 84. The first guide groove 82 extends in the movement direction D1. The second guide groove 84 extends in the movement direction D1. In the illustrated embodiment, the support member 78 includes a first support portion 86 and a second support portion 88 spaced apart from the first support portion 86. The first end portion 72 of the operating member 50 is provided between the first support portion 86 and the second support portion 88 in a first axial direction D2 parallel to the first pivot axis A1. The first guide groove 82 is provided on the first support portion 86. The second guide groove 84 is provided on the second support portion 88.

The coupling member 80 includes a first guide end portion 90 and a second guide end portion 92. The first guide end portion 90 is provided in the first guide groove 82. The second guide end portion 92 is opposite to the first guide end portion 90 and is provided in the second guide groove 84. Accordingly, it is possible to effectively stabilize the movement of the piston rod 52 with a simple structure such as the first guide groove 82 and the second guide groove 84. The coupling member 80 extends in the first axial direction D2. The second guide end portion 92 is opposite to the first guide end portion 90 in the first axial direction D2.

As seen in FIG. 8, the coupling member 80 includes a threaded hole 94. The piston rod 52 includes an externally threaded portion 96 provided on an outer periphery of the second rod end portion 56. The externally threaded portion 96 is configured to be engaged with the threaded hole 94. Accordingly, it is possible to easily adjust a position of the piston rod 52 relative to the coupling member 80 by rotating the piston rod 52 relative to the coupling member.

The piston rod 52 includes an adjustment operating portion 98 configured to be operated by a user to rotate the piston rod 52 relative to the coupling member 80. The adjustment operating portion 98 is provided at the second rod end portion 56. In the illustrated embodiment, the piston rod 52 is rotatable relative to the piston 22 about the center axis CA1 of the piston rod 52 and the coupling member 80.

As seen in FIG. 9, the adjustment operating portion 98 includes a tool engagement hole 98a configured to be engaged with a tool such as a hexagon wrench. Rotation of the piston rod 52 relative to the coupling member 80 changes a position of the coupling member 80 relative to the piston rod 52 along the center axis CA1. This allows the initial position P11 of the piston 22 to be adjusted via the adjustment operating portion 98.

Since the piston rod 52 includes the adjustment operating portion 98, it is possible to easily adjust the position of the piston rod 52 relative to the coupling member via the adjustment operating portion 98. Since the adjustment operating portion 98 is provided at the second rod end portion 56, it is possible to easily access the adjustment operating portion 98 via a space which surrounds the second rod end portion 56 in the operating member 50.

Figure 10:
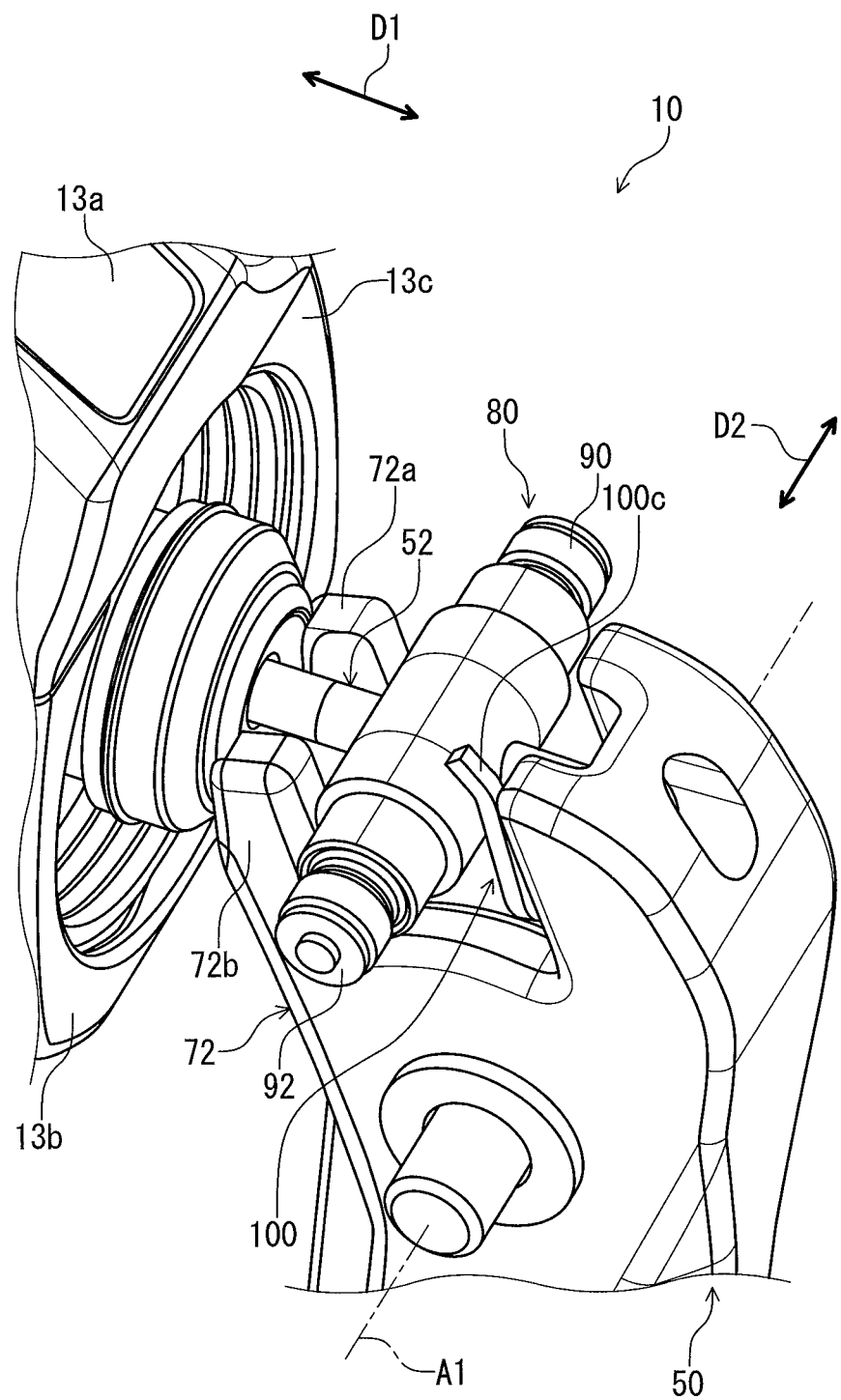
FIG. 10 is a partial perspective view of the bicycle operating device illustrated in FIG. 1 with a support member omitted.

In FIG. 10, the support member 78 is omitted from the bicycle operating device 10. As seen in FIG. 10, the first end portion 72 of the operating member 50 includes a first engagement portion 72a and a second engagement portion 72b. The first engagement portion 72a and the second engagement portion 72b are configured to engage with the coupling member 80. The first engagement portion 72a is spaced apart from the second engagement portion 72b in the first axial direction D2. The piston rod 52 is provided between the first engagement portion 72a and the second engagement portion 72b.

As seen in FIG. 9, the bicycle operating device 10 comprises a lever biasing member 100 configured to bias the operating member 50 (FIG. 8) to be in contact with the coupling member 80. The lever biasing member 100 is mounted to the support member 78 via the pivot shaft 79. The lever biasing member 100 includes a coiled body 100a, a first biasing end 100b, and a second biasing end 100c. The pivot shaft 79 extends through the coiled body 100a. The first biasing end 100b is configured to engage with the operating member 50. The second biasing end 100c is configured to engage with the coupling member 80. The coupling member 80 is pushed against the first engagement portion 72a and the second engagement portion 72b of the first end portion 72 by the lever biasing member 100.

As seen in FIG. 8, the support member 78 is pivotable relative to the hydraulic cylinder 20 about a second pivot axis A2 non-parallel to the first pivot axis A1. In the illustrated embodiment, the second pivot axis A2 coincides with the center axis CA1 of the piston rod 52. The second pivot axis A2 is parallel to the movement direction D1 of the piston 22. Since the support member 78 is pivotable relative to the hydraulic cylinder 20 about the second pivot axis A2 non-parallel to the first pivot axis A1, it is possible to utilize a pivotal movement of the support member 78 to actuate the bicycle component BC2. Since the second pivot axis A2 coincides with the center axis CA1 of the piston rod 52, it is possible to smooth the pivotal movement of the support member 78.

Figure 11:
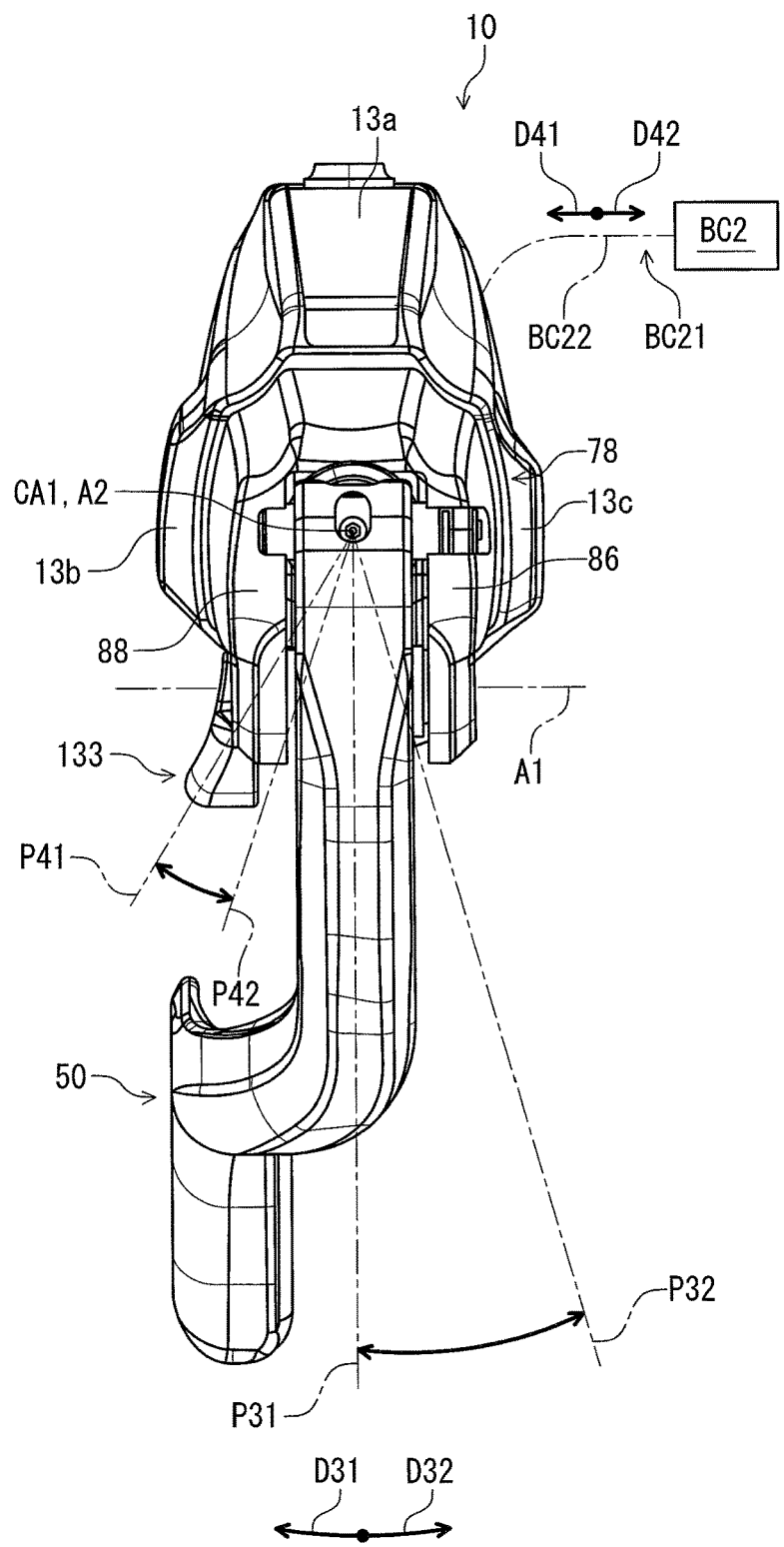
FIG. 11 is a front elevational view of the bicycle operating device illustrated in FIG. 1.

As seen in FIG. 11, the support member 78 is pivotable relative to the hydraulic cylinder 20 (FIG. 8) about the second pivot axis A2 between a first rest position P31 and a first operated position P32. The operating member 50 is pivotally mounted to the support member 78 about the first pivot axis A1 non-parallel to the second pivot axis A2. Accordingly, the operating member 50 is pivotable relative to the hydraulic cylinder 20 (FIG. 8) about the second pivot axis A2 between the first rest position P31 and the first operated position P32.

As seen in FIG. 8, the bicycle operating device 10 further comprises a coupling shaft 102 configured to couple the support member 78 to the hydraulic cylinder 20. The coupling shaft 102 is secured to the hydraulic cylinder 20 and extends from the hydraulic cylinder 20 to the support member 78 in the movement direction D1. The coupling shaft 102 includes a tubular body 104 extending in the movement direction D1. The bicycle operating device 10 comprises a bearing unit 106 mounted on the tubular body 104. The support member 78 is pivotally mounted to the coupling shaft 102 via the bearing unit 106.

The tubular body 104 includes a shaft through-hole 104a extending in the movement direction D1. The shaft through-hole 104a is connected with the cylinder bore 26. The piston rod 52 extends through the shaft through-hole 104a in the movement direction D1. A diameter of the shaft through-hole 104a is larger than the maximum outer diameter of the second rod end portion 56 of the piston rod 52. A clearance is provided between the piston rod 52 and an inner periphery of the tubular body 104. However, the piston rod 52 can be in contact with the inner periphery of the tubular body 104 if needed and/or desired.

As seen in FIG. 8, the support member 78 is configured to be coupled to the operating unit 24 to transmit a pivotal movement of the support member 78 to the operating unit 24. The operating unit 24 is configured to actuate the at least one bicycle component via a control cable in response to the pivotal movement of the support member 78. Accordingly, it is possible to utilize the pivotal movement of the support member 78 to actuate the bicycle component BC2 via the operating unit 24. In the illustrated embodiment, the operating unit 24 is configured to actuate the bicycle component BC2 (FIG. 4) via the control cable BC21 (FIG. 4) in response to the pivotal movement of the support member 78.

As seen in FIG. 8, the operating unit 24 includes a base plate 108, a wire control member 110, and a positioning member 112. The wire control member 110, the positioning member 112, and the base plate 108 are provided between the hydraulic cylinder 20 and the support member 78 in the movement direction D1. The wire control member 110 and the positioning member 112 are provided between the hydraulic cylinder 20 and the base plate 108. The base plate 108 is coupled to the base member 12 with fasteners 114. The base plate 108 is stationary relative to the hydraulic cylinder 20 and the base member 12. The base plate 108 includes an attachment hole 108a. The coupling shaft 102 extends through the attachment hole 108a. The coupling shaft 102 is supported by the base member 12 via the base plate 108.

The wire control member 110 and the positioning member 112 are integrally rotatable relative to the base plate 108 about a rotational axis A3. In the illustrated embodiment, the rotational axis A3 coincides with each of the second pivot axis A2 and the center axis CA1 of the piston rod 52. The wire control member 110 and the positioning member 112 are rotatably mounted on the coupling shaft 102.

Figure 12:
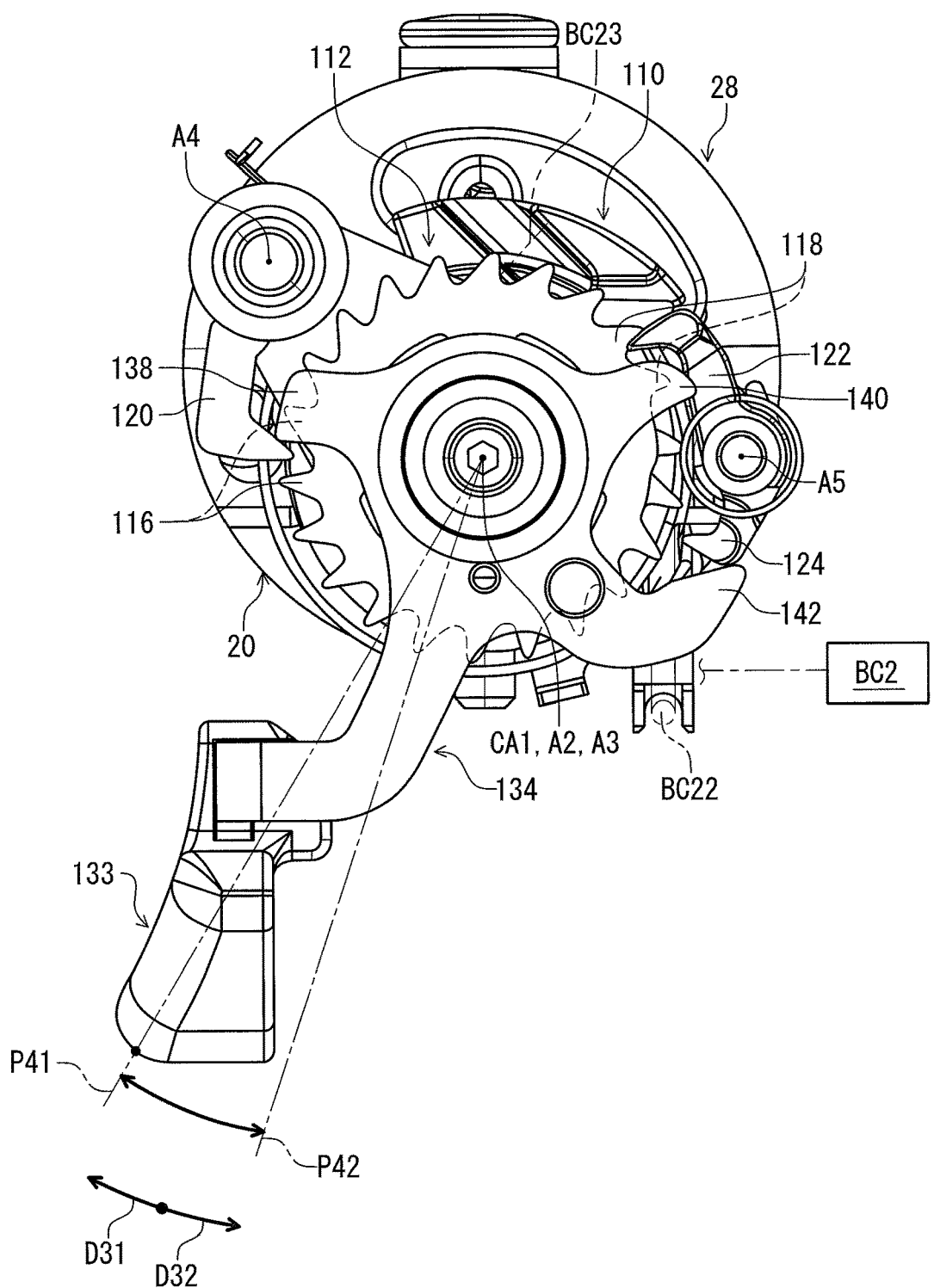
FIG. 12 is a front elevational view of an operating unit of the bicycle operating device illustrated in FIG. 1.

As seen in FIG. 12, an end BC23 of an inner wire BC22 of the control cable BC21 is attached to the wire control member 110. The positioning member 112 includes winding teeth 116 and positioning teeth 118. The operating unit 24 includes a winding pawl 120, a positioning pawl 122, and a stopping pawl 124.

Figure 13:
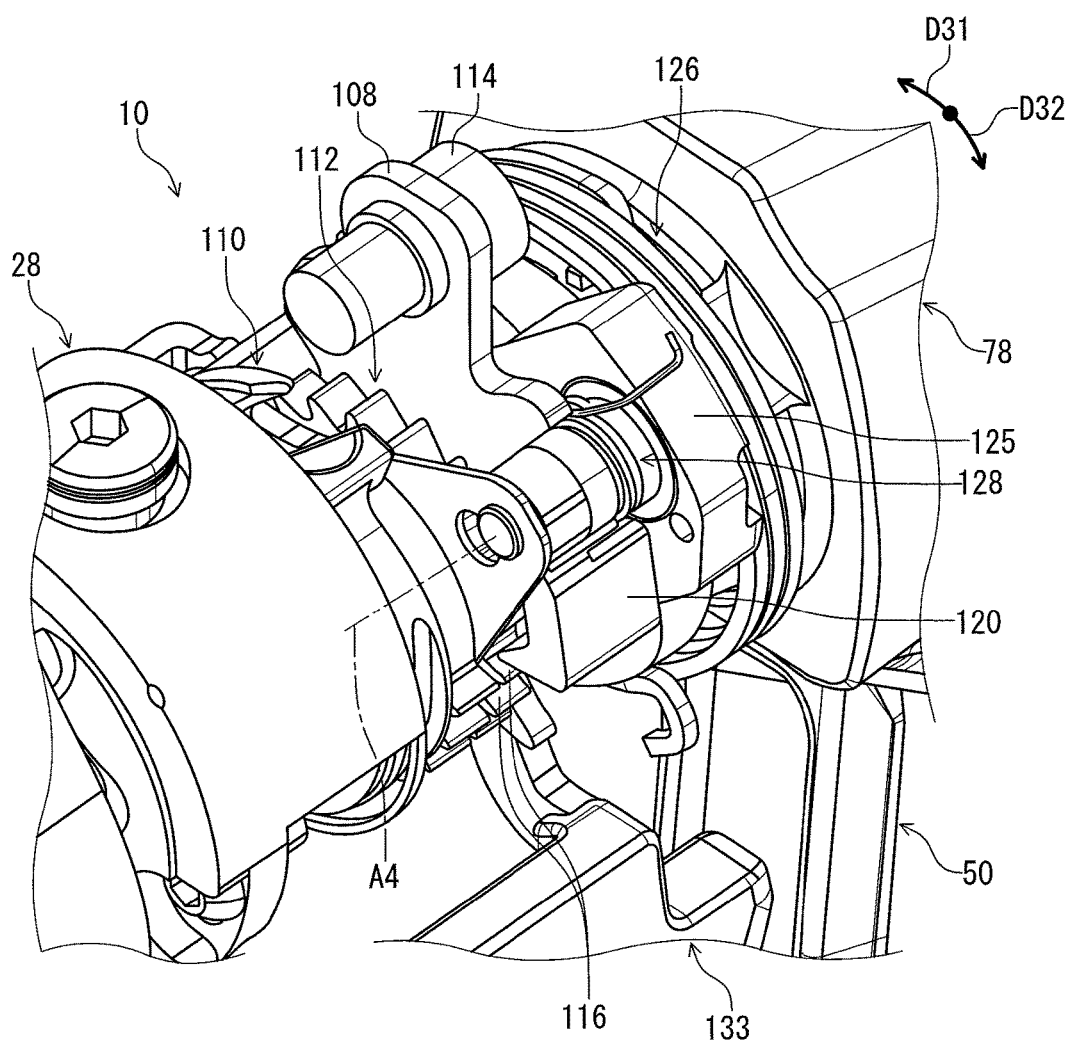
FIG. 13 is a partial perspective view of the operating unit of the bicycle operating device in FIG. 1.

As seen in FIG. 13, the winding pawl 120 is pivotable relative to the support member 78 about a first pawl axis A4. The winding pawl 120 is pivotally mounted to a pawl support 125 of the support member 78. The winding pawl 120 is selectively engageable with one of the winding teeth 116 to transmit a pivotal movement of the support member 78 to the wire control member 110 via the positioning member 112.

Figure 14:
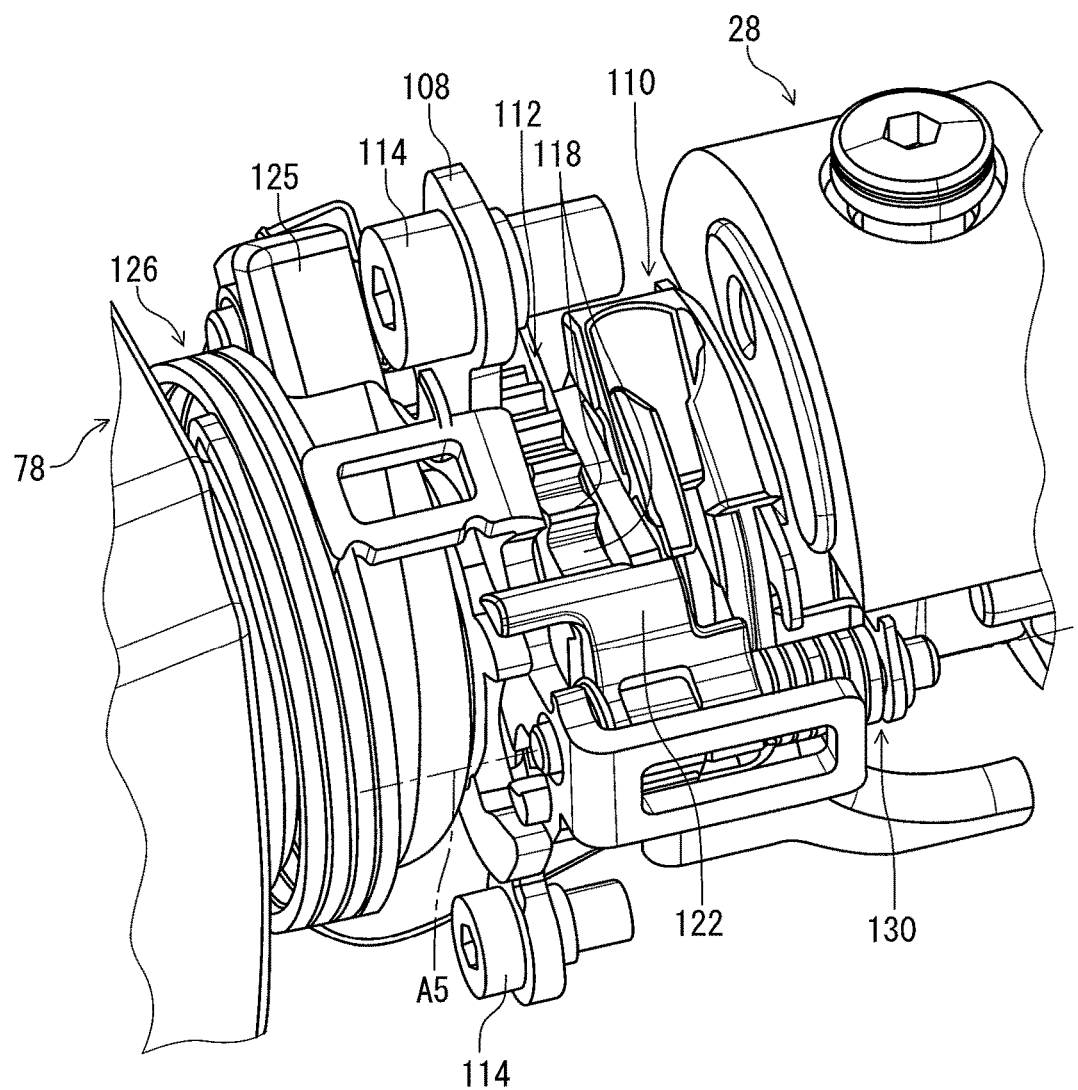
FIG. 14 is a partial perspective view of the operating unit of the bicycle operating device in FIG. 1.

As seen in FIG. 14, the positioning pawl 122 is pivotable relative to the base plate 108 about a second pawl axis A5. The positioning pawl 122 is pivotally mounted to the base plate 108. The positioning pawl 122 is configured to selectively engage with one of the positioning teeth 118 to position the wire control member 110 at one of rotational positions.

Figure 15:
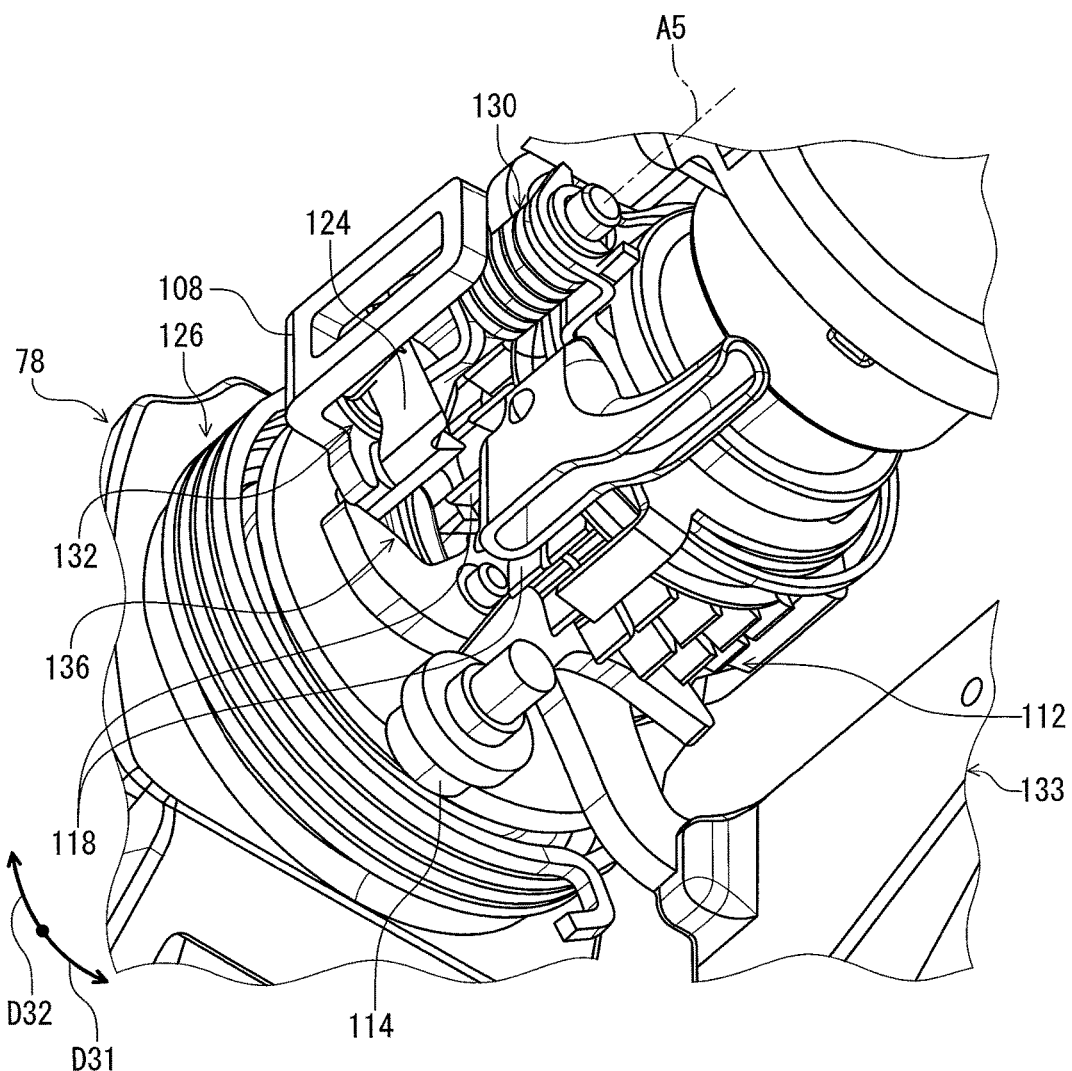
FIG. 15 is a partial perspective view of the operating unit of the bicycle operating device in FIG. 1.

As seen in FIG. 15, the stopping pawl 124 is pivotable relative to the base plate 108 and the positioning pawl 122 about the second pawl axis A5. The stopping pawl 124 is pivotally mounted to the base plate 108. The stopping pawl 124 is selectively engageable with one of the positioning teeth 118 to temporarily position the wire control member 110 when the positioning pawl 122 disengages from the positioning teeth 118.

As seen in FIG. 13, the operating unit 24 includes a first biasing element 126 and a second biasing element 128. The first biasing element 126 is configured to bias the support member 78 relative to the base plate 108 about the second pivot axis A2 in a first rotational direction D31. The support member 78 is positioned at the first rest position P31 by the base plate 108. When the operating member 50 is pivoted from the first rest position P31 toward the first operated position P32, the support member 78 pivots in a second rotational direction D32 opposite to the first rotational direction D31. The second biasing element 128 is configured to bias the winding pawl 120 to move away from the winding teeth 116.

As seen in FIG. 14, the operating unit 24 includes a third biasing element 130. The third biasing element 130 is configured to bias the positioning pawl 122 toward the positioning teeth 118 to engage with one of the positioning teeth 118.

As seen in FIG. 15, the operating unit 24 includes a fourth biasing element 132. The fourth biasing element 132 is configured to bias the stopping pawl 124 to disengage from the positioning teeth 118.

As seen in FIG. 1, the bicycle operating device 10 further comprises an additional operating member 133 movable relative to the hydraulic cylinder 20. As seen in FIG. 12, the additional operating member 133 is configured to be coupled to the operating unit 24. The additional operating member 133 is pivotable relative to the hydraulic cylinder 20 about the second pivot axis A2 between a second rest position P41 and a second operated position P42. The release member 134 is positioned by the base plate 108 at the second rest position P41.

Specifically, the operating unit 24 includes a release member 134. The release member 134 is pivotable relative to the base plate 108 about the rotational axis A3. The release member 134 is pivotally mounted on the coupling shaft 102. The additional operating member 133 is coupled to the release member 134. The additional operating member 133 is pivotable relative to the base plate 108 about the rotational axis A3 together with the release member 134.

As seen in FIG. 15, the operating unit 24 includes a fifth biasing element 136. The fifth biasing element 136 is configured to bias the release member 134 in the first rotational direction D31.

As seen in FIG. 12, the release member 134 includes a first actuating portion 138, a second actuating portion 140, and a third actuating portion 142. The first actuating portion 138 is configured to actuate the winding pawl 120 to pivot to a disengagement position where the winding pawl 120 does not engage with the winding teeth 116 of the positioning member 112 in response to a pivotal movement of the release member 134. The first actuating portion 138 is further configured to position the winding pawl 120 at an engagement position where the winding pawl 120 is engageable with the winding teeth 116 of the positioning member 112.

The second actuating portion 140 is configured to actuate the positioning pawl 122 to disengage from the positioning teeth 118 in response to the pivotal movement of the release member 134. The third actuating portion 142 is configured to actuate the stopping pawl 124 to engage with one of the positioning teeth 118 instead of the positioning pawl 122 in response to the pivotal movement of the release member 134. The third actuating portion 142 is further configured to position the stopping pawl 124 at a disengagement position where the stopping pawl 124 does not engage with the positioning teeth 118.

As seen in FIG. 11, the operating unit 24 is configured to move the control cable BC21 relative to the hydraulic cylinder 20 in a first operating direction D41 in response to the pivotal movement of the support member 78. The operating unit 24 is configured to move the control cable BC21 relative to the hydraulic cylinder 20 in a second operating direction D42 which is different from the first operating direction D41 in response to a movement of the additional operating member 133. Accordingly, it is possible to respectively move the control cable BC21 in the first and second operating directions D41 and D42 using the support member 78 and the additional operating member 133.

In the illustrated embodiment, the inner wire BC22 of the control cable BC21 is pulled and positioned at one of cable positions by the operating unit 24 when the operating member 50 is pivoted relative to the hydraulic cylinder 20 about the second pivot axis A2 from the first rest position P31 to the first operated position P32. The inner wire BC22 of the control cable BC21 is released and positioned at one of the cable positions by the operating unit 24 when the additional operating member 133 is pivoted relative to the hydraulic cylinder 20 about the second pivot axis A2 from the second rest position P41 to the second operated position P42.

Since the operations of the operating unit 24 has been known in the bicycle field, they will not be described and/or illustrated in detail here for the sake of brevity. While the operating unit 24 is configured to actuate the bicycle component BC2 in the illustrated embodiment, the operating unit 24 can be configured to actuate a plurality of bicycle components if needed and/or desired.

With the bicycle operating device 10, the piston 22 is configured to receive the pulling force F1 to generate the hydraulic pressure to the bicycle hydraulic component BC1. Accordingly, it is possible to easily ensure the strength of the piston 22 and/or a member (e.g., the piston rod 52) transmitting the pulling force F1 to the piston 22 compared with a piston configured to receive a pushing force. Furthermore, since the bicycle operating device 10 comprises the operating unit 24, it is possible to operate the at least one bicycle component (e.g., the bicycle component BC2) in addition to the bicycle hydraulic component BC1.

With the bicycle operating device 10, the piston 22 is configured to receive the pulling force F1 to generate the hydraulic pressure to the bicycle hydraulic component BC1. Accordingly, it is possible to easily ensure the strength of the piston 22 and/or a member transmitting the pulling force F1 to the piston 22 compared with a piston configured to receive a pushing force. Furthermore, the piston rod 52 is movable relative to the hydraulic cylinder 20 in the movement direction D1 together with the piston 22 so that the orientation of the piston rod 52 is constant relative to the piston 22. Accordingly, it is possible to reduce a space in which the piston rod 52 moves, allowing a surrounding space of the piston rod 52 to be utilized.

Second Embodiment

A bicycle operating device 210 in accordance with a second embodiment will be described below referring to FIG. 16. The bicycle operating device 210 has the same configuration as the bicycle operating device 10 except for the operating unit 24. Thus, elements having substantially the same function as those in the first embodiment will be numbered the same here, and will not be described and/or illustrated again in detail here for the sake of brevity.

Figure 16:
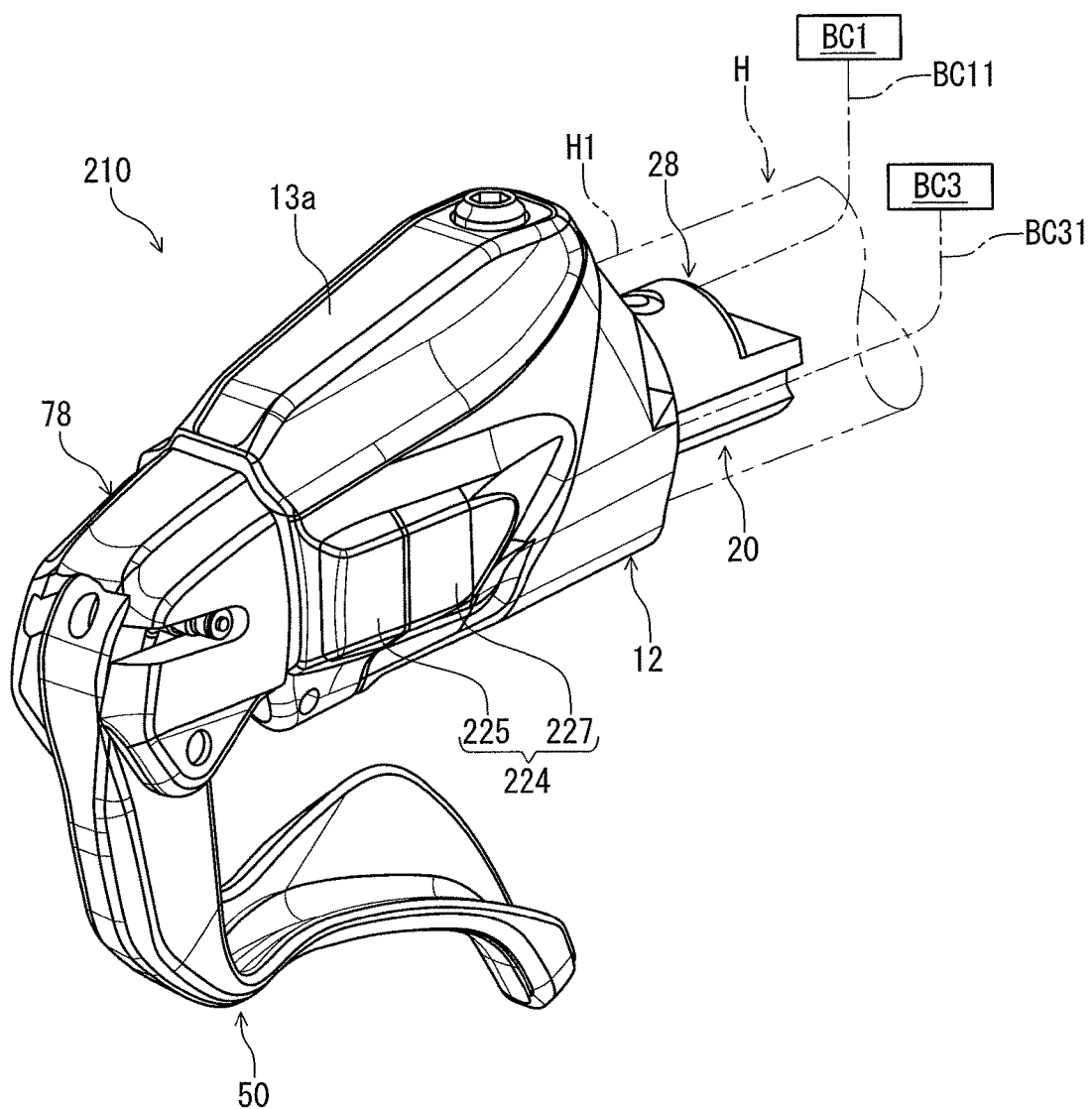
FIG. 16 is a perspective view of a bicycle operating device in accordance with a second embodiment.

As seen in FIG. 16, the bicycle operating device 210 comprises an operating unit 224 configured to actuate at least one bicycle component different from the bicycle hydraulic component BC1. The operating unit 224 is configured to be provided outside the handlebar H. Accordingly, it is possible to improve the design possibility of the operating unit 224.

In the illustrated embodiment, the operating unit 224 is configured to actuate a bicycle component BC3 such as a shifting device. Unlike the operating unit 24 in the first embodiment, the operating unit 224 includes an electrical switch. In the illustrated embodiment, the operating unit 224 includes electrical switches 225 and 227. The electrical switch 225 is configured to be operated by the user to upshift the bicycle component BC3. The electrical switch 227 is configured to be operated by the user to downshift the bicycle component BC3. The operating unit 224 can include a signal generator (not shown) provided in the base member 12 to generate command signals based on operations of the electrical switches 225 and 227. The operating unit 224 is operatively connected to the bicycle component BC3. In the illustrated embodiment, the operating unit 224 is electrically connected to the bicycle component BC3 via an electrical cable BC31. However, the operating unit 224 can be wirelessly connected to the bicycle component BC3 if needed and/or desired.

In the illustrated embodiment, the support member 78 can be stationary relative to the hydraulic cylinder 20. Thus, the support member 78 can be integrally provided with the hydraulic cylinder 20 if needed and/or desired.

With the bicycle operating device 210, it is possible to obtain substantially the same advantageous effects as those of the bicycle operating device 10 in accordance with the first embodiment.

It will be apparent to those skilled in the bicycle field from the present disclosure that the constructions of the above embodiments can at least partially combined with each other if needed and/or desired. For example, at least one of the electrical switches 225 and 227 can be applied to the bicycle operating device 10 as a part of the operating unit 24. In such an embodiment, the operating unit 24 is configured to actuate a mechanical bicycle component (e.g., the bicycle component BC2) and an electrical bicycle component (e.g., the bicycle component BC3).

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle operating device comprising:
a hydraulic cylinder including a cylinder bore;
a piston provided in the cylinder bore and movable relative to the hydraulic cylinder, the piston being configured to receive a pulling force to generate a hydraulic pressure to a bicycle hydraulic component;
an operating unit configured to actuate at least one bicycle component different from the bicycle hydraulic component;
an operating member operatively connected to the piston to move the piston in a movement direction;
a piston rod configured to couple the operating member to the piston; and
a support member configured to pivotally support the operating member such that the operating member downwardly extends from the support member in a state where the bicycle operating device is mounted to a handlebar, wherein
the operating member is configured to be pivotable about a pivot axis, and
the pivot axis of the operating member is disposed below the piston rod in the state where the bicycle operating device is mounted to a handlebar.

2. The bicycle operating device according to claim 1, wherein
the operating member is movable relative to the hydraulic cylinder in response to an operating force and configured to be coupled to the piston to transmit the operating force to the piston as the pulling force.

3. The bicycle operating device according to claim 1, wherein
the operating member is configured to be pivotable between a rest position and an operated position relative to the hydraulic cylinder about a first pivot axis, and
the piston is configured to be moved toward the first pivot axis when the operating member is operated from the rest position to the operated position.

4. The bicycle operating device according to claim 3, wherein
the piston is configured to receive the pulling force when the operating member is operated from the rest position to the operated position.

5. The bicycle operating device according to claim 3, wherein
the piston is movable relative to the hydraulic cylinder in the movement direction, and
the piston rod is movable relative to the hydraulic cylinder in the movement direction together with the piston.

6. The bicycle operating device according to claim 5, wherein
the piston rod is movable relative to the hydraulic cylinder in the movement direction together with the piston so that an orientation of the piston rod is constant relative to the piston.

7. The bicycle operating device according to claim 5, wherein
the piston rod includes
a center axis,
a first rod end portion coupled to the piston, and
a second rod end portion opposite to the first rod end portion along the center axis, and
the piston rod is movable relative to the hydraulic cylinder in the movement direction together with the piston so that the center axis is parallel to the movement direction.

8. The bicycle operating device according to claim 5, wherein
the operating member includes a first end portion and a second end portion opposite to the first end portion, and
the first end portion of the operating member is configured to be coupled to the piston rod.

9. The bicycle operating device according to claim 8, wherein
the first pivot axis is provided between the first end portion and the second end portion.

10. The bicycle operating device according to claim 8, wherein
the support member is configured to pivotally support the operating member about the first pivot axis.
11. The bicycle operating device according to claim 10, wherein
the piston rod includes
a center axis,
a first rod end portion coupled to the piston, and
a second rod end portion opposite to the first rod end portion along the center axis, and
the support member is configured to support the second rod end portion to be movable relative to the hydraulic cylinder in the movement direction.
12. A bicycle operating device comprising:
a hydraulic cylinder including a cylinder bore;
a piston provided in the cylinder bore and movable relative to the hydraulic cylinder, the piston being configured to receive a pulling force to generate a hydraulic pressure to a bicycle hydraulic component;
an operating unit configured to actuate at least one bicycle component different from the bicycle hydraulic component;
an operating member configured to be pivotable between a rest position and an operated position relative to the hydraulic cylinder about a first pivot axis, wherein
the piston is configured to be moved toward the first pivot axis when the operating member is operated from the rest position to the operated position;
a piston rod configured to couple the operating member to the piston, wherein
the piston is movable relative to the hydraulic cylinder in a movement direction,
the piston rod is movable relative to the hydraulic cylinder in the movement direction together with the piston,
the operating member includes a first end portion and a second end portion opposite to the first end portion, and
the first end portion of the operating member is configured to be coupled to the piston rod;
a support member configured to pivotally support the operating member about the first pivot axis, wherein
the piston rod includes
a center axis,
a first rod end portion coupled to the piston, and
a second rod end portion opposite to the first rod end portion along the center axis, and
the support member is configured to support the second rod end portion to be movable relative to the hydraulic cylinder in the movement direction; and
a coupling member configured to be coupled to the second rod end portion, wherein
the support member is configured to support the coupling member to be movable relative to the support member in the movement direction.
13. The bicycle operating device according to claim 12, wherein
the support member includes
a first guide groove extending in the movement direction, and
a second guide groove extending in the movement direction, and
the coupling member includes
a first guide end portion provided in the first guide groove, and
a second guide end portion opposite to the first guide end portion and provided in the second guide groove.
14. The bicycle operating device according to claim 12, wherein
the coupling member includes a threaded hole, and
the piston rod includes an externally threaded portion provided on an outer periphery of the second rod end portion and configured to be engaged with the threaded hole.
15. The bicycle operating device according to claim 14, wherein
the piston rod includes an adjustment operating portion configured to be operated by a user to rotate the piston rod relative to the coupling member.
16. The bicycle operating device according to claim 15, wherein
the adjustment operating portion is provided at the second rod end portion.
17. A bicycle operating device comprising:
a hydraulic cylinder including a cylinder bore;
a piston provided in the cylinder bore and movable relative to the hydraulic cylinder, the piston being configured to receive a pulling force to generate a hydraulic pressure to a bicycle hydraulic component;
an operating unit configured to actuate at least one bicycle component different from the bicycle hydraulic component;
an operating member configured to be pivotable between a rest position and an operated position relative to the hydraulic cylinder about a first pivot axis, wherein
the piston is configured to be moved toward the first pivot axis when the operating member is operated from the rest position to the operated position;
a piston rod configured to couple the operating member to the piston, wherein
the piston is movable relative to the hydraulic cylinder in a movement direction,
the piston rod is movable relative to the hydraulic cylinder in the movement direction together with the piston,
the operating member includes a first end portion and a second end portion opposite to the first end portion, and
the first end portion of the operating member is configured to be coupled to the piston rod; and
a support member configured to pivotally support the operating member about the first pivot axis, wherein
the piston rod includes
a center axis,
a first rod end portion coupled to the piston, and
a second rod end portion opposite to the first rod end portion along the center axis,
the support member is configured to support the second rod end portion to be movable relative to the hydraulic cylinder in the movement direction, and
the support member is pivotable relative to the hydraulic cylinder about a second pivot axis non-parallel to the first pivot axis.
18. The bicycle operating device according to claim 17, wherein
the second pivot axis coincides with the center axis of the piston rod.
19. The bicycle operating device according to claim 17, wherein
the support member is configured to be coupled to the operating unit to transmit a pivotal movement of the support member to the operating unit, and the operating unit is configured to actuate the at least one bicycle component via a control cable in response to the pivotal movement of the support member.

20. The bicycle operating device according to claim 19, further comprising:
an additional operating member movable relative to the hydraulic cylinder and configured to be coupled to the operating unit, wherein
the operating unit is configured to move the control cable relative to the hydraulic cylinder in a first operating direction in response to the pivotal movement of the support member, and
the operating unit is configured to move the control cable relative to the hydraulic cylinder in a second operating direction which is different from the first operating direction in response to a movement of the additional operating member.

21. The bicycle operating device according to claim 1, wherein
the hydraulic cylinder is configured to be at least partially provided in a handlebar.

22. The bicycle operating device according to claim 21, further comprising:
a hydraulic reservoir configured to be in communication with the hydraulic cylinder, wherein
the hydraulic reservoir is configured to be at least partially provided in the handlebar.

23. The bicycle operating device according to claim 1, wherein
the operating unit is configured to be provided outside a handlebar.

24. The bicycle operating device according to claim 1, wherein
the operating unit includes an electrical switch.

25. A bicycle operating device comprising:
a hydraulic cylinder including a cylinder bore;
a piston provided in the cylinder bore and movable relative to the hydraulic cylinder in a movement direction, the piston being configured to receive a pulling force to generate a hydraulic pressure to a bicycle hydraulic component;
a piston rod operatively coupled to the piston and movable relative to the hydraulic cylinder in the movement direction together with the piston so that an orientation of the piston rod is constant relative to the piston;
a coupling member coupled to the piston;
an operating member operatively coupled to the piston via the piston rod and the coupling member; and
a support member configured to pivotally support the operating member, wherein
the support member is configured to support the coupling member to be movable relative to the support member in the movement direction, and
the hydraulic cylinder is configured to be at least partially provided in a handlebar.

26. The bicycle operating device according to claim 25, wherein
the operating member is configured to be pivotable about a pivot axis, and
the pivot axis of the operating member is disposed below the piston rod in the state where the bicycle operating device is mounted to a handlebar.

27. The bicycle operating device according to claim 1, wherein
the support member is pivotable relative to the hydraulic cylinder about an axis parallel to the movement direction.

28. A bicycle operating device comprising:
a hydraulic cylinder including a cylinder bore;
a piston provided in the cylinder bore and movable relative to the hydraulic cylinder, the piston being configured to receive a pulling force to generate a hydraulic pressure to a bicycle hydraulic component;
an operating unit configured to actuate at least one bicycle component different from the bicycle hydraulic component;
a coupling member coupled to the piston;
an operating member operatively connected to the piston via the coupling member to move the piston in a movement direction;
a piston rod configured to couple the operating member to the piston; and
a support member configured to pivotally support the operating member, wherein
the support member is configured to support the coupling member to be movable relative to the support member in the movement direction, and
the hydraulic cylinder is configured to be at least partially provided in a handlebar.

* * * * *